(12) United States Patent
McGrew

(10) Patent No.: US 7,095,850 B1
(45) Date of Patent: Aug. 22, 2006

(54) ENCRYPTION METHOD AND APPARATUS WITH FORWARD SECRECY AND RANDOM-ACCESS KEY UPDATING METHOD

(75) Inventor: David McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 1000 days.

(21) Appl. No.: 09/982,375

(22) Filed: Oct. 17, 2001

Related U.S. Application Data

(63) Continuation-in-part of application No. 09/675,570, filed on Sep. 29, 2000, now Pat. No. 6,862,354.

(51) Int. Cl.
*H04L 9/00* (2006.01)

(52) U.S. Cl. .................... 380/42; 380/37; 380/43; 380/44; 380/45; 380/46; 380/47

(58) Field of Classification Search ............... 380/37, 380/42–47, 28–30, 277; 708/252
See application file for complete search history.

(56) References Cited

U.S. PATENT DOCUMENTS

| | | | | |
|---|---|---|---|---|
| 5,454,039 | A | 9/1995 | Coppersmith et al. | 380/28 |
| 5,675,652 | A | 10/1997 | Coppersmith et al. | 380/28 |
| 5,835,597 | A | 11/1998 | Coppersmith et al. | 380/28 |
| 6,862,354 | B1 * | 3/2005 | McGrew et al. | 380/42 |

OTHER PUBLICATIONS

B. Schneier, "Applied Cryptography: Protocols, Algorithms and Source Code in C," 2nd ed. (New York: John Wiley & Sons, 1996), pp. 400-402.

Rogaway, P. and Coppersmith, D., "A Software-Optimized Encryption Algorithm", Proc. of 1994 Fast Software Encryption Workshop, Lecture Notes In Computer Science, vol. 809, Springer-Verlag, 1994, pp. 56-63, reprinted in J. Cryptology 11:4, Springer-Verlag, 1998, pp. 273-287, and http://www.cs.ucdavis.edu/~rogaway/papers/seal-abstract.html.

M. Bellare et al., "Forward Integrity for Secure Audit Logs," Dept. Comp. Sci. Eng., Univ. Calif. at San Diego, Nov. 23, 1997.

B. Schneier et al., "Cryptographic Support for Secure Logs on Untrusted Machines," Proc. Seventh USENIX Security Symposium, USENIX Press, Jan. 1998, pp. 53-62.

S. Kent et al., "Security Architecture for the Internet Protocol,"IETF Request for Comments (RFC) 2401, The Internet Society, Nov. 1998.

S. Kent et al., "IP Authentication Header," IETF Request for Comments (RFC) 2402, The Internet Society, Nov. 1998.

(Continued)

*Primary Examiner*—Jacques H. Louis-Jacques
*Assistant Examiner*—Jacob Lipman
(74) *Attorney, Agent, or Firm*—Hickman Palermo Truong & Becker LLP

(57) ABSTRACT

An encryption method and apparatus that provides forward secrecy, by updating the key using a one-way function after each encryption. By providing forward secrecy within a cipher, rather than through a key management system, forward secrecy may be added to cryptographic systems and protocols by using the cipher within an existing framework. A random-access key updating method can efficiently generate one or more future keys in any order. Embodiments are applicable to forward secret ciphers that are used to protect protocols with unreliable transport, to ciphers that are used in multicast or other group settings, and to protection of packets using the IPSec protocols.

25 Claims, 17 Drawing Sheets

OTHER PUBLICATIONS

S. Kent et al., "IP Encapsulating Security Payload (ESP)," IETF Request for Comments (RFC) 2406, The Internet Society, Nov. 1998.

D. Harkins et al., "The Internet Key Exchange (IKE)," RFC 2409, The Internet Society, Nov. 1998.

H. Orman, "The OAKLEY Key Determination Protocol," RFC 2412, The Internet Society, Nov. 1998.

* cited by examiner

ENCRYPTION METHOD AND APPARATUS WITH FORWARD SECRECY AND RANDOM-ACCESS KEY UPDATING METHOD

CROSS-REFERENCE TO RELATED APPLICATIONS; PRIORITY CLAIM

Continuation-in-part of application Ser. No. 09/675,570, filed Sep. 29, 2000, now U.S. Pat. No. 6,862,354, from which domestic priority is hereby claimed under 35 U.S.C. §120, the entire contents of which are hereby incorporated by reference as if fully set forth herein.

FIELD OF INVENTION

The present invention generally relates to cryptology. The invention relates more specifically to an encryption method and apparatus that provides forward secrecy, including a random-access key updating method for generating a future segment of keystream for use in encryption or decryption.

BACKGROUND OF THE INVENTION

Stream ciphers convert a plaintext to a ciphertext one bit at a time. In general, a stream cipher has a keystream generator that outputs a keystream consisting of a series of bits that, for perfect security, vary in value in an unpredictable manner. Each keystream bit is combined using a Boolean exclusive-OR operation (XOR) with an incoming bit of the plaintext, resulting in an output bit of the ciphertext. Thus, an additive stream cipher encrypts a plaintext by bitwise adding a pseudo-randomly generated keystream into the plaintext, modulo two.

For decryption, the ciphertext bits are XORed with an identical keystream to recover the plaintext bits. Accordingly, a stream cipher is ideally suited to encrypting a continuing stream of data, such as the data passing over a network connection between two computers or other network elements. Also, the security of a stream cipher resides in the randomness of the keystream, however, the keystream must be reproducible in identical form at decryption time. Therefore, design of the keystream generator is essential to security and practical operation.

FIG. 1A is a simplified block diagram of a stream cipher. A key K 401 is fed to keystream generator 402, which outputs keystream 410. Plaintext 412 is encrypted by an encryption function 416 based on keystream 410. As a result, ciphertext output 414 is produced.

The keystream generator of such a stream cipher can be described in terms of a state update function and an output function. For example, in FIG. 1A, keystream generator 402 has internal state information 404, a next state function 406 (state update function), and output function 408. The state update function maps the internal state of the keystream generator at one instant to its next value. The output function maps the internal state to a segment of keystream, and the keystream is defined as the concatenation of the values of the output function. Further background information on stream ciphers is provided in B. Schneier, "Applied Cryptography: Protocols, Algorithms and Source Code in C," $2^{nd}$ ed. (New York: John Wiley & Sons, 1996).

Block ciphers such as the Data Encryption Standard (DES) are popularly used for encryption of computer communications. However, empirical evidence indicates that stream ciphers are faster than block ciphers at equivalent security levels. For example, in practical evaluation, the stream ciphers RC4 and SEAL have been determined to be significantly faster than any secure block cipher when implemented on general-purpose computer processors. Further, RC4 and SEAL have survived years of scrutiny by cryptanalysts. SEAL is described in U.S. Pat. No. 5,454,039; U.S. Pat. No. 5,675,652; U.S. Pat. No. 5,835,597; Rogaway, P. and Coppersmith, D., "A Software-Optimized Encryption Algorithm", Proceedings of the 1994 Fast Software Encryption Workshop, Lecture Notes In Computer Science, Volume 809, Springer-Verlag, 1994, pp. 56–63; Rogaway, P. and Coppersmith, D., "A Software-Optimized Encryption Algorithm", Journal of Cryptology, Volume 11, Number 4, Springer-Verlag, 1998, Pages 273–287, and in the file named "seal-abstract.html" in the folder "~rogaway/papers/" of the domain "cs.ucdavis.edu" on the World Wide Web (www). Both SEAL and RC4 are discussed in Schneier.

Further, theoretically, a stream cipher is inherently immune to a chosen plaintext attack, and can contain more state information than a block cipher. A block cipher needs to have both encryption and decryption to be secure, and needs to have the avalanche property from the middle to both ends. For example, changing a single bit in the middle of the cipher should change each bit of the input and the output with probability of about ½. Also, the stream cipher has the advantage that its outputs are ordered, while a block cipher must be able to efficiently compute every possible output in any possible order. As a result, for many applications stream ciphers are now clearly preferable over block ciphers.

Unfortunately, many stream ciphers have a significant limitation; most cannot efficiently seek to an arbitrary location in their keystream. In this context, seeking to an arbitrary location in the keystream means generating a segment of keystream that is conceptually located an arbitrary number of bits ahead of that portion of keystream that would be generated by ordinary operation of the keystream in its then-current state. This capability is required for numerous practical applications. For example, in a communications protocol that uses unreliable transport, there is no guarantee that data packets of a particular flow will arrive in order, or arrive at all. Examples of such protocols include Internet Protocol (IP), UDP, and RTP. Such protocols commonly experience loss and reorder of packets in practice. Therefore, for a flow that includes successive packets a, b, and c, a cipher may need to decrypt packet c before it decrypts packet b if packet c arrives before packet b. A stream cipher can be used to provide privacy for data communicated using such protocols, if the cipher can seek to the proper location in the keystream for packet c based on a sequence number.

Similarly, an encrypted disk partition or file system can use a stream cipher if the cipher supports the seek operation.

These examples do not require the random access capability of a block cipher, in which all inputs are equally simple to compute. Rather, the example applications require the capability to seek into the keystream, with a seek time that is not significant relative to the time required to generate the keystream itself. In this context, "seek" is used in the same sense as used in the POSIX and ANSI C functions for repositioning the offset of a file descriptor.

In one past approach to providing a stream cipher with a seek capability, the state update function is made linear in some field. In this approach, a seek is a composition of linear operations, and therefore is itself linear. This approach is similar to using a block cipher in counter mode, which imposes requirements on the output function that are similar to the requirements on block ciphers.

In an alternative approach, as taken by Rogaway et al. in the design of the SEAL cipher, a special seek function is defined that pseudo-randomly maps an index and a fixed key to an internal state of a keystream generator. Based on this state information, the keystream generator can generate a length of keystream. The keystream for the cipher is defined to be the concatenation of the keystreams generated for each index, with indices in ascending order. Effectively, this approach creates a stream cipher that can seek to some regularly spaced locations in its keystream.

While this approach is satisfactory for many applications, some applications may require the ability to seek to an arbitrary location in the keystream. For example, an encrypted database containing many small records could have this requirement. In addition, the seek function approach adds security requirements. The seek function itself must be secure, and the seek and advance functions must be such that they do not interact in an insecure way.

Based on the foregoing, there is a clear need for an additive stream cipher method that can seek to an arbitrary location in its keystream.

There is a specific need for a stream cipher that provides a keystream seek capability without using a linear state update function, and without a special seek function.

There is also a need to provide such a stream cipher in an embodiment that achieves excellent performance when executed in software implemented for general-purpose computer processors.

Some cryptographic systems benefit from the property of forward secrecy, in which the compromise of a current key does not cause or imply the compromise of all messages that were previously encrypted with that key or another key. For example, the Internet Key Exchange (IKE) can, optionally, provide forward secrecy by establishing session keys using the Diffie-Hellman key exchange with ephemeral public keys, as described in D. Harkins et al., "The Internet Key Exchange (IKE)," RFC 2409, November 1998, and H. Orman, "The OAKLEY Key Determination Protocol," RFC 2412, November 1998.

In general, a cryptographic system that encrypts a sequence of messages $m_0, m_1, m_2 \ldots$ provides forward security (or "forward secrecy") against an adversary A if the disclosure of all the secret state values of the system between the encryption of messages $m_i$ and $m_{i+1}$ does not compromise to A any of the messages $m_0, m_1, m_i \ldots$, which were encrypted before such disclosure, provided that A was not capable of compromising such messages before such disclosure.

Forward security can be provided in a symmetric key encryption system through a process of key updating. Key updating is a technique for providing forward secrecy by using a pseudorandom function to update a key, thus producing a sequence of keys. A key updating function maps a key to another key. For example, a key updating function f may produce a sequence $K_0, K_1=f(K_0), K_2=f(K_1), \ldots, k_l$ of l keys. In a practical key updating function, it is computationally infeasible to compute $K_j$ given $K_i$ whenever j<i.

A segmented stream cipher such as SEAL, the cipher described above, and Counter Mode, is used in cryptographic systems in which the plaintext and ciphertext are segmented. Each segment is identified by a non-repeating integer. Symbolically, the keystream may be viewed as composed of $2^t$ segments $S_0, S_1, \ldots$, and the segments are indexed by a t-bit value. A segmented cipher that provides forward secrecy could associate a distinct key in a key updating sequence with each segment of the keystream. Thus, $$S_i = g(K_i),$$

wherein the function g maps keys to segments. Based on the foregoing, there is a clear need in this field for a way to provide forward security in a segmented stream cipher.

A cipher that provides forward security may have vulnerability to run-up attacks. A run-up attack is a denial-of-service attack against a protocol that uses the cipher. An adversary sends bogus ciphertexts with packet indices that are far in advance of the last valid index. The receiver of such packets cannot distinguish such packets as invalid without "running up" the cipher to the proper keystream location. Therefore, there is a need for a way protect against run-up attacks.

Embodiments described herein include a key updating process for providing forward security in a packet security protocol such as IPSec. Packet data communication is often carried using an unreliable data network transport protocol. Examples of unreliable transport protocols include IP, UDP, and RTP. Such protocols may deliver packets out of sequence, and may fail to deliver some packets at all. As a result, a cipher that provides forward secrecy, and is used by a node that receives packets, may need to generate segment keys out of order, for corresponding out-of-order packets. Further, the cipher cannot discard segment keys that have not been used and that may be needed.

In such an approach, a positive constraint is that actual security protocols for use over unreliable transport permit only a certain amount of packet reordering, and reject packets with indices that precede the most recently received index by too great a factor. For example, the IPSec encapsulating security payload (ESP) includes a sequence number in each packet, enabling a receiver to determine the proper sequencing of the packets, and to determine if a packet has been received before. Packets with a sequence number ("index") that precedes the most recently received index by too great a factor are dropped. The receiver maintains a replay window, which may be a list of which index values in a fixed range have been received, and the window moves forward as legitimate packets are received. Thus, such protocols enforce a sliding window within which keys may be generated. Keys are not generated for just-received packets that are too old. A pseudocode description of this approach is:

```
if the index I precedes the replay window then
    reject the packet
else
    if i is already in the replay window then
        reject the packet
    else
        authenticate and decrypt the packet;
        add i to the replay window;
        slide replay window forward if needed
    end if
end if
```

Accordingly, there is a need for a cipher providing forward security that can efficiently implement this approach, to provide resistance to run-up attacks.

Forward secrecy is desirable for use with group keys that protect communications among multiple nodes or devices, such as in Internet multicasting. When multiple devices have a key, the chance of compromising the key increases. Forward secrecy can solve this problem, by ensuring that compromise of a current key does not affect previous traffic.

Forward secrecy is also desirable to enhance the security of system logs, as described in M. Bellare et al., "Forward Integrity for Secure Audit Logs," Technical Report, 1997, and in a paper presented by B. Schneier et al., USENIX Security Symposium, 1997. By authenticating each log message with a forward authentication code, a logging system gains the feature that any modification or removal of log messages will be evident to an auditor who knows the authentication key. By updating the authentication key using a one-way function after each message is authenticated, the log system also gains forward secrecy, and an intruder who gains control of a system protected by such a log is unable to unalterably erase the log messages that betray his presence.

In the past, message authentication codes with forward security have been described, especially in the context of secure logging systems. Digital signature systems with forward security are also known. However, these descriptions do not relate to a security system that provides privacy, do not provide for key updating within a cryptographic protocol, and do not address key generation in the presence of imperfect synchronization.

Keystream generators with a random-access property are known. However, these generators do not provide forward security.

Based on the foregoing, there is a clear need in this field for a way to generate keystream or keystream segments for use in encipherment, with forward security.

There is also a need for an approach that provides random access, such that any segment of keystream can be generated on demand.

SUMMARY OF THE INVENTION

The foregoing needs, and other needs and objects that will become apparent for the following description, are achieved in the present invention, which comprises, in one aspect, a stream cipher encryption method and apparatus that provides forward secrecy, by updating the key using a one-way function after each encryption. By providing forward secrecy within a cipher, rather than through a key management system, forward secrecy may be added to cryptographic systems and protocols by using the cipher within an existing framework.

A random-access key updating method can efficiently generate one or more future keys in any order. Embodiments are applicable to forward secret ciphers that are used to protect protocols with unreliable transport, and are applicable to ciphers that are used in multicast or other group settings.

A location value that identifies a location of the keystream segment within the complete keystream is received. A state value for a leaf node of a balanced binary tree is created and stored, wherein the leaves of the tree represent the complete keystream and the leaf node represents the keystream segment at the location, by a traversal of the tree from root node to the leaf node wherein a leftward tree branch transition comprises computing a first pseudo-random function and a rightward tree branch transition comprises computing a second pseudo-random function. The keystream segment is created and stored by applying a third function to the state value of the leaf node. The entire keystream can be efficiently computed, in order, via a preorder traversal of the tree.

According to another aspect, the invention provides a stream cipher encryption method and apparatus that can efficiently seek to arbitrary locations in a keystream. A segment of plaintext is received, along with information indicating where the segment of plaintext is located within a complete plaintext. Based on the location information, a keystream segment for that location is created and stored. The segment of plaintext is then enciphered by combining the keystream segment with the plaintext segment using an exclusive OR operation, resulting in creating and storing a segment of ciphertext.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A stream cipher encryption method and apparatus that provides forward secrecy, by updating the key using a one-way function after each encryption. By providing forward secrecy within a cipher, rather than through a key management system, forward secrecy may be added to cryptographic systems and protocols by using the cipher within an existing framework.

A random-access key updating method can efficiently generate one or more future keys in any order. Embodiments are applicable to forward secret ciphers that are used to protect protocols with unreliable transport. Examples of unreliable transport protocols with which embodiments may be used include IP, UDPT, and RTP. Embodiments also are applicable to ciphers that are used in multicast or other group settings.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Computation Tree Approach

An improved additive stream cipher is defined in part by a keystream generating approach that uses a balanced binary tree.

Figure 1A:
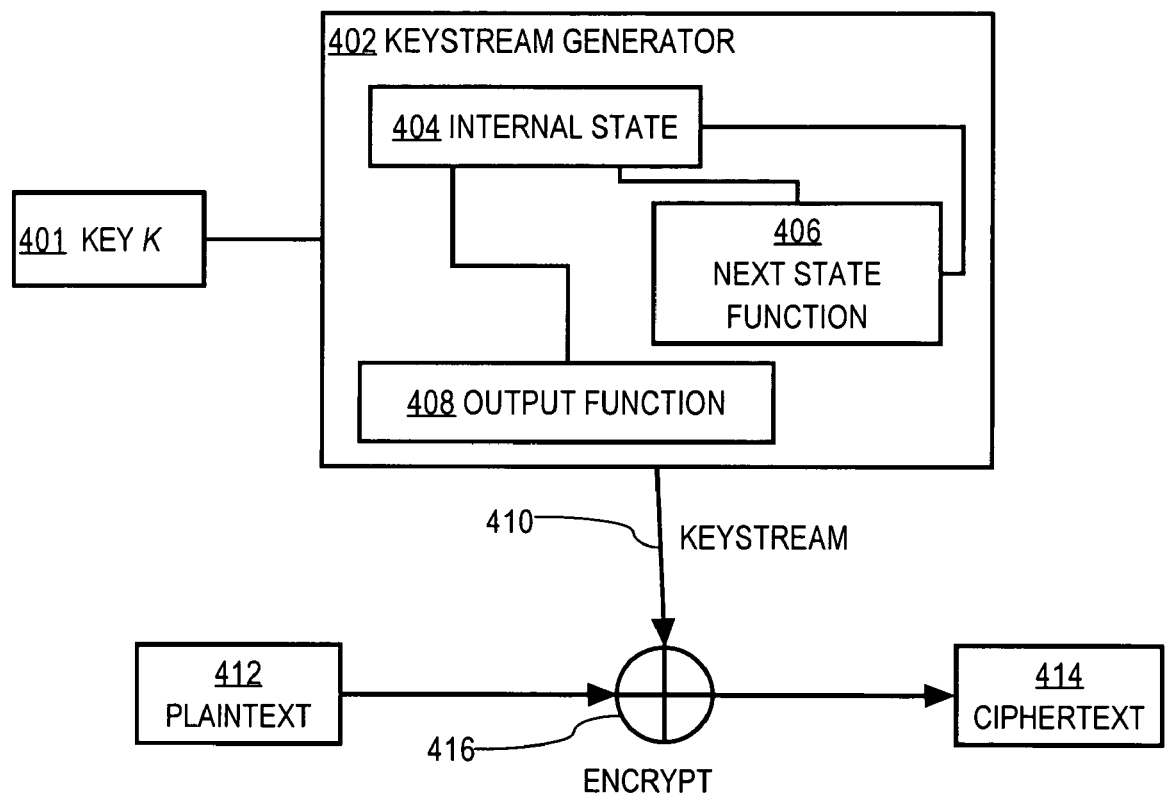
FIG. 1A is a simplified block diagram of a stream cipher.
Figure 1B:
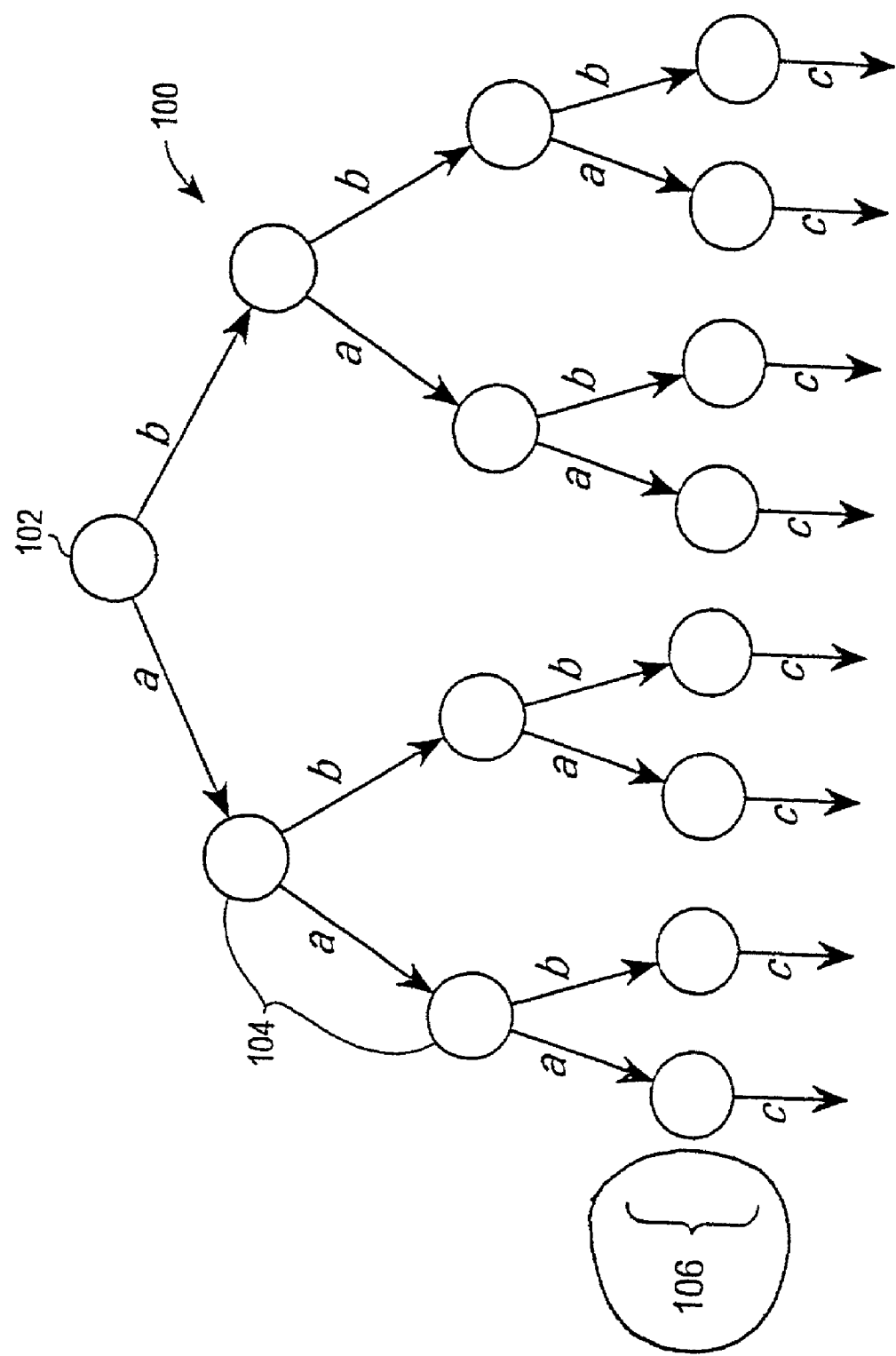
FIG. 1B is a block diagram of a portion of a balanced binary tree that may be used in one embodiment.

FIG. 1B is a block diagram of a portion of a balanced binary tree that may be used in one embodiment. In the example tree 100 of FIG. 1, root node 102 has fixed state information. Each intermediate node 104 provides a transition path from root node 102 to two of a plurality of leaf nodes 106. Each leaf node 106 represents and is associated with a small length of keystream.

Computation of a keystream segment at a specified location within the complete keystream is carried out by computing from the root node 102 to one of the leaf nodes 106 that is associated with the specified location, then computing the rest of the nodes using a pre-order tree traversal. Thus seeking to a location in the keystream is equivalent to computing the state for a particular leaf 106 in the tree 102, a computation that requires computational effort that is logarithmic in the size of the keystream.

The root node 104 and each leaf node 106 contain m bits of state information. A left branch of tree 102 is computed using the nonlinear function $a: GF(2^m) \rightarrow GF(2^m)$ and a right branch is computed using the nonlinear function $b: GF(2^m) \rightarrow GF(2^m)$ The outputs of the cipher are computed by applying the function $c: GF(2^m) \rightarrow GF(2^r)$ to the state information of the leaf nodes, which maps the n internal bits to an output of size r. Accordingly, in FIG. 1B, leftward transitions from node to node have reference label a to indicate that such transitions involve computing function a. Similarly, rightward transitions from node to node have reference label b to indicate that such transitions involve computing function b. Exit paths from leaf nodes 106 have reference label c to indicate that such paths involve computing function c.

Generating a complete keystream in order is done by a preorder traversal of the entire tree, starting at the root. A binary tree with height h contains $2^h-1$ nodes, $2^{h-1}$ leaves, and $2^{h-1}-2$ edges. In this context, a tree with one node is defined as having height one. Each edge is computed exactly once in a traversal of the tree. Therefore, the present approach can generate keystream at a rate of approximately:

$$\frac{r2^{h-1}}{R_c 2^{h-1} + R_{ab}(2^h - 2)} \cong \frac{r}{R_c + 2R_{ab}}$$

where $R_c$ is the rate at which the function c can be evaluated, and $R_{ab}$ is the average rate at which the functions a and b can be evaluated.

In one embodiment, the tree is implemented by creating and storing a stack in memory of h elements, the $i^{th}$ element of which contains the state information of the node on the $i^{th}$ path from the root to the leaf corresponding to the current output. Thus, the computation tree defines a cipher with mh bits of internal state, wherein the state update function modifies only a portion of the current state. An important implementation consideration is that the preorder traversal is readily adaptable to parallel processing.

The functions a and b are comparable to the round functions of a substitution-permutation network. They are the main source of non-linearity in the cipher disclosed herein. The function c can be used to hide the internal state, as it has fewer outputs than inputs.

Cipher Processing Functions and Key Setup Approach

In one embodiment, a stream cipher that can seek to an arbitrary location in its keystream involved computing functions a, b, and c, and a key setup approach.

Improved Cipher Processing Approach

Some general-purpose central processing units, such as the Intel x86 family of processors, have no more than seven (7) available registers. In one specific embodiment, a cipher approach is optimized to operate with seven registers. Accordingly, in this embodiment, the present approach achieves high throughput on general-purpose processors.

Figure 1C:
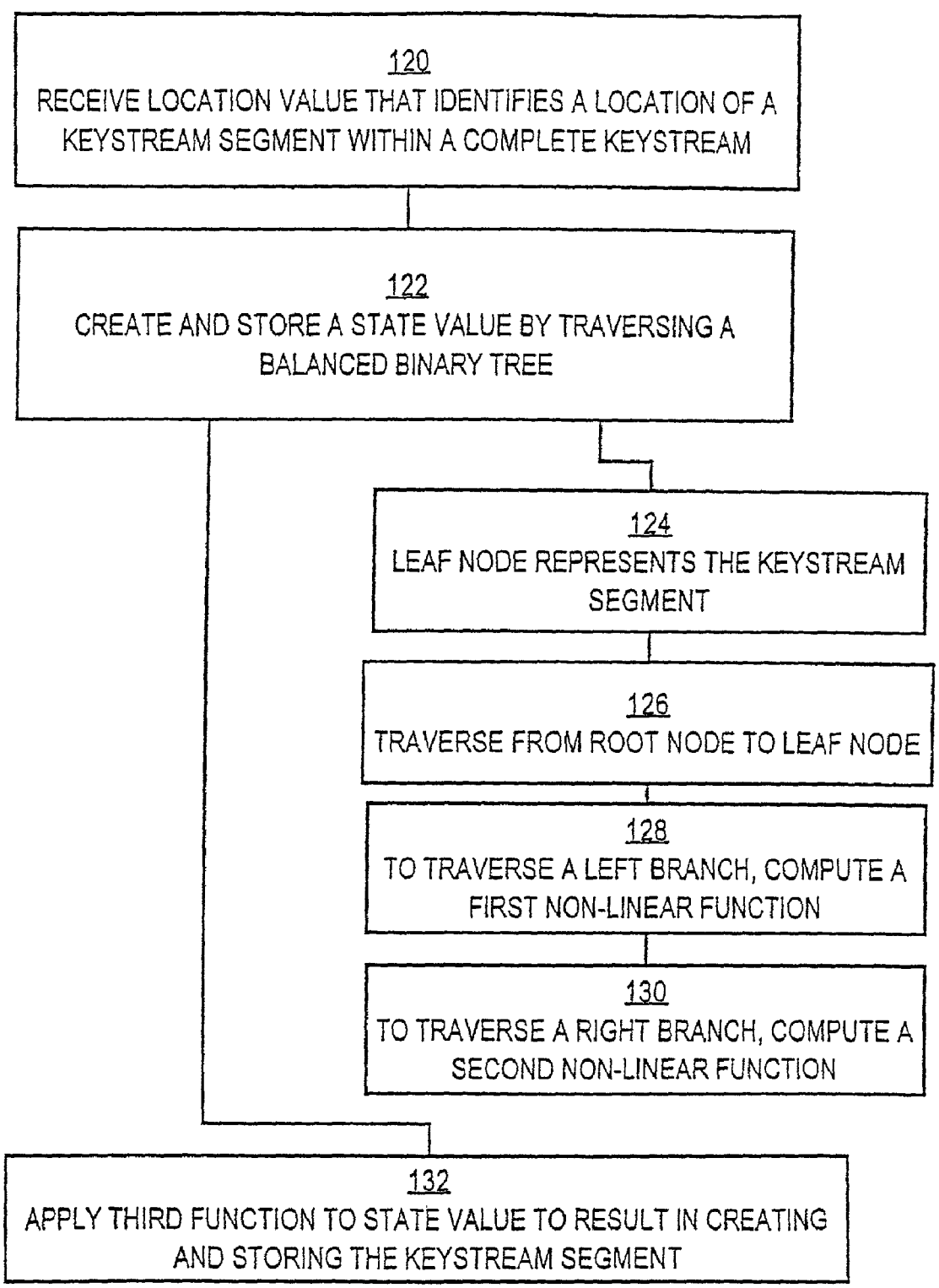
FIG. 1C is a flow diagram of a method of generating a segment of a keystream.

FIG. 1C is a flow diagram of a method of generating a segment of a keystream. In block 120, a location value that identifies a location of a keystream segment within a complete keystream is received. In data communication applications, the location value may comprise a packet identifier that indicates the relative order, within a flow of packets, of a packet that has been received out of order with respect to other packets in the flow.

In block 122, a state value is created and stored by conceptually traversing a balanced binary tree that represents the complete keystream. As stated in block 124, a leaf node in the tree represents the keystream segment. Traversal proceeds from the root node to the leaf node associated with the specified keystream segment, as shown in block 126. To traverse a left branch, a first non-linear function is computed, as shown by block 128. To traverse a right branch, a second non-linear function is computed, as shown by block 130.

In block 132, a third function is applied to the state value, to result in creating and storing the keystream segment.

Figure 1D:
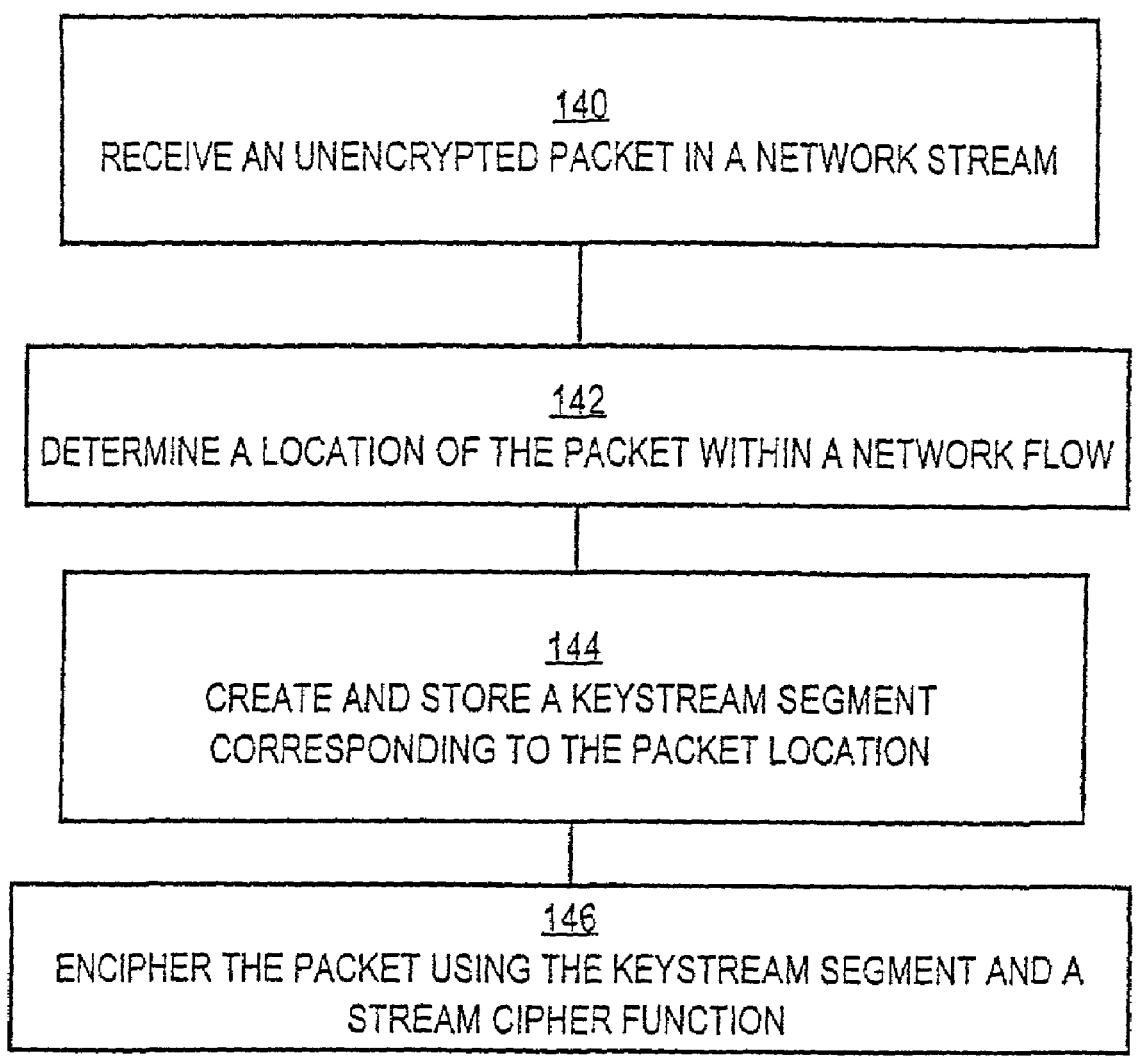
FIG. 1D is a flow diagram of a method of encrypting network communications.

FIG. 1D is a flow diagram of a method of encrypting network communications.

In block 140, an unencrypted packet is received as part of a stream of network communications. Block 140 may involve receiving one or more packets at any suitable network device or end station, such as a router, switch, gateway, server, etc. Also, the unencrypted information may comprise a portion of a packet, e.g., a payload of a packet wherein the header is treated separately.

In block 142, a location of the packet within a network flow is determined. Block 142 may involve, for example, determining the order of a particular packet within a larger flow of multiple packets, where the packets are received out of order.

In block 144, a keystream segment corresponding to the packet location is created and stored. Block 144 may involve carrying out the steps of FIG. 1C in order to generate a segment of keystream appropriate for the received packet.

In block 146, the packet is encrypted or enciphered using the keystream segment as applied to a stream cipher function. Block 146 may involve encrypting only the payload of a packet.

The process of FIG. 1D and the other processes described herein are applicable to encryption of packets that form portions of voice over Internet Protocol flows in network communications as part of the IPSec protocol, and for the encryption of unreliable network traffic in general, for example, traffic transported using the UDP protocol.

In one embodiment, the number m of bits of state per node, and the key size, are specified by parameter values. The parameterizable width enables reduced size versions of the cipher to be studied, enabling numerical experiments on the cipher to be more meaningful. The parameterizable key size is useful to adapt the cipher to different security policies, and to protect against typical plaintext attacks by enabling keys to be increased in size to compensate for the possibility of cryptographic attacks that use precomputation. See, e.g., D. McGrew et al., "Attacks on Linearly Redundant Plaintext and Implications on Internet Security," the Proceedings of the Seventh Annual Workshop on Selected Areas in Cryptography.

Accordingly, in one embodiment, m is restricted to being a multiple of twelve, because of the internal structure of the functions a and b. In the description herein, x, y and z denote n bit quantities, and each node 104, 106 of tree 100 has $m=3n$ bits of state denoted as $z|y|x$, where the symbol | denotes concatenation, and n is a multiple of four In one embodiment, the state contained by each node 102, 104, 106 of tree 100 contains a unique node number to ensure that two distinct nodes cannot have the same state. The node number is denoted as z, and counted as part of the state of the node to which it corresponds. The node number of the root node 102 is defined as one. If the node number of a node is z, that of its left child is $2z$ and that of its right child is $2z+1$. Functions of the cipher use substitution, rotation, and addition modulo $2^n$. The "filter" function c is defined as the linear reduction of 2n bits to 2 bits. The branching functions a and b are defined as the composition of a diffusion function d with the nonlinear "confusion" functions f and g. Thus, $$a = f \circ d$$

and $$b = g \circ d$$

The definitions of functions f, g, d, and c are $$f(z|y|x) = 2z | S(R(S(R(y)))) | L(S(L(S(x))))$$

$$g(z|y|x) = 2z+1 | L(S(L(S(y)))) | S(R(S(R(\Box x))))$$

$$d(z|y|x) = z | x+y+z | 2x+y+z$$

$$c(z|y|x) = x \oplus y$$

where integer addition modulo two to the power n is denoted as +, bitwise exclusive-or is denoted as $\oplus$, and bitwise complementation is denoted as $\Box$. The functions R and L indicate rotation by n/4 bits and to the right and left, respectively (where "right" means in the direction of the least significant bit). The nonlinear function S is implemented as a key-dependent substitution table.

Figure 2:
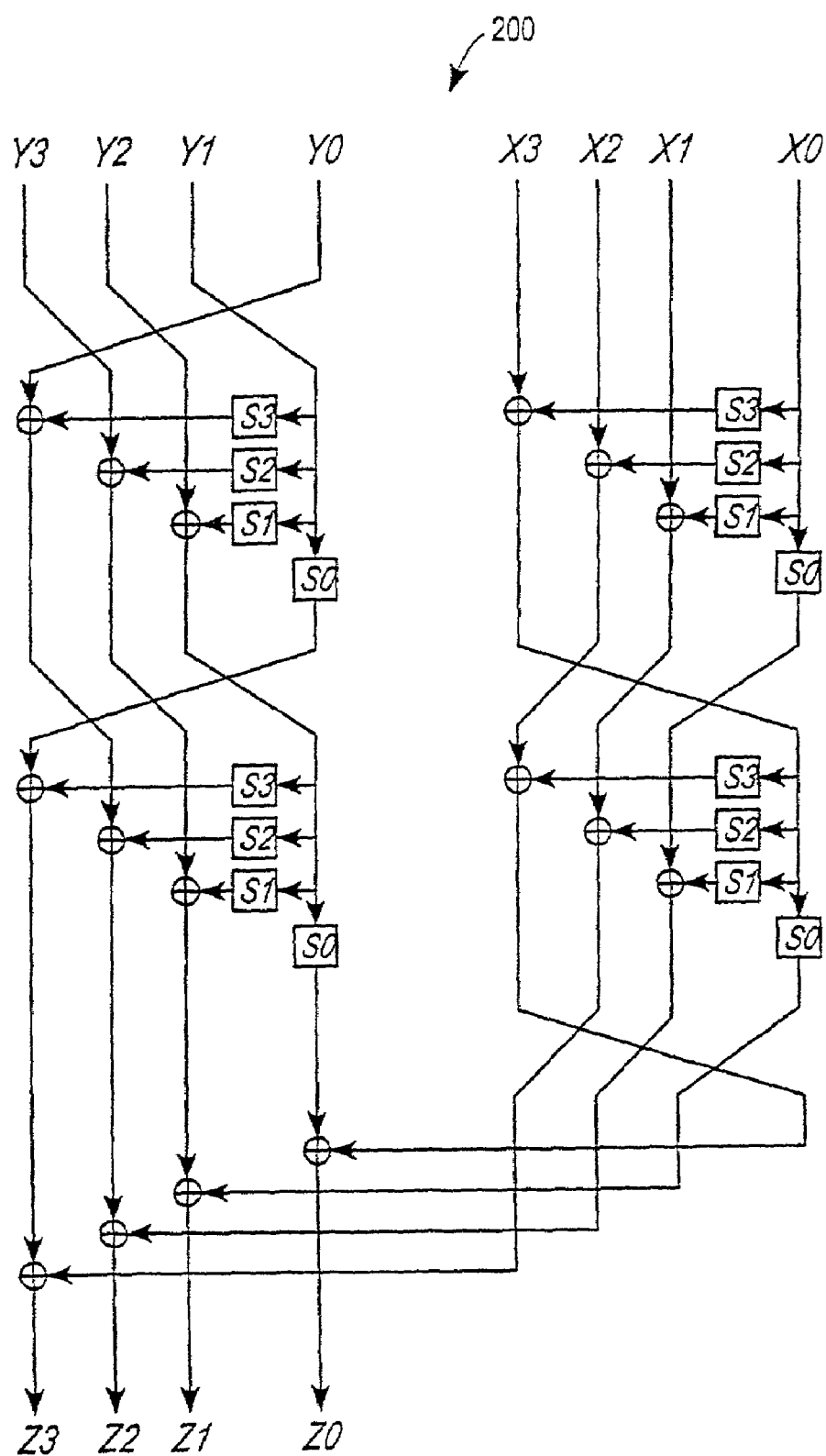
FIG. 2 is a computational graph diagram that illustrates one embodiment of a function $c \circ f$.
Figure 3:
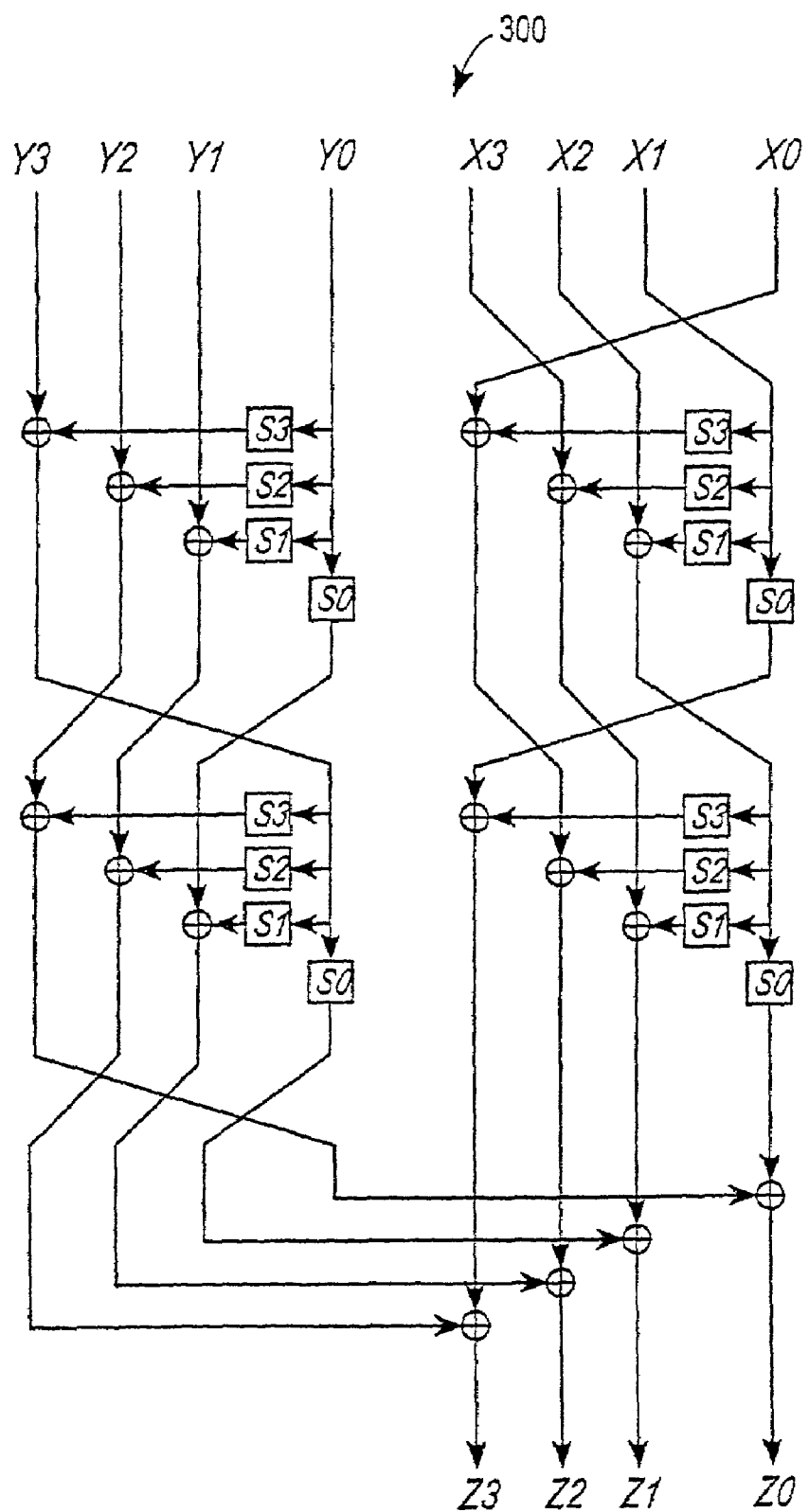
FIG. 3 is a computational graph diagram that illustrates one embodiment of a function $c \circ g$.
Figure 4:
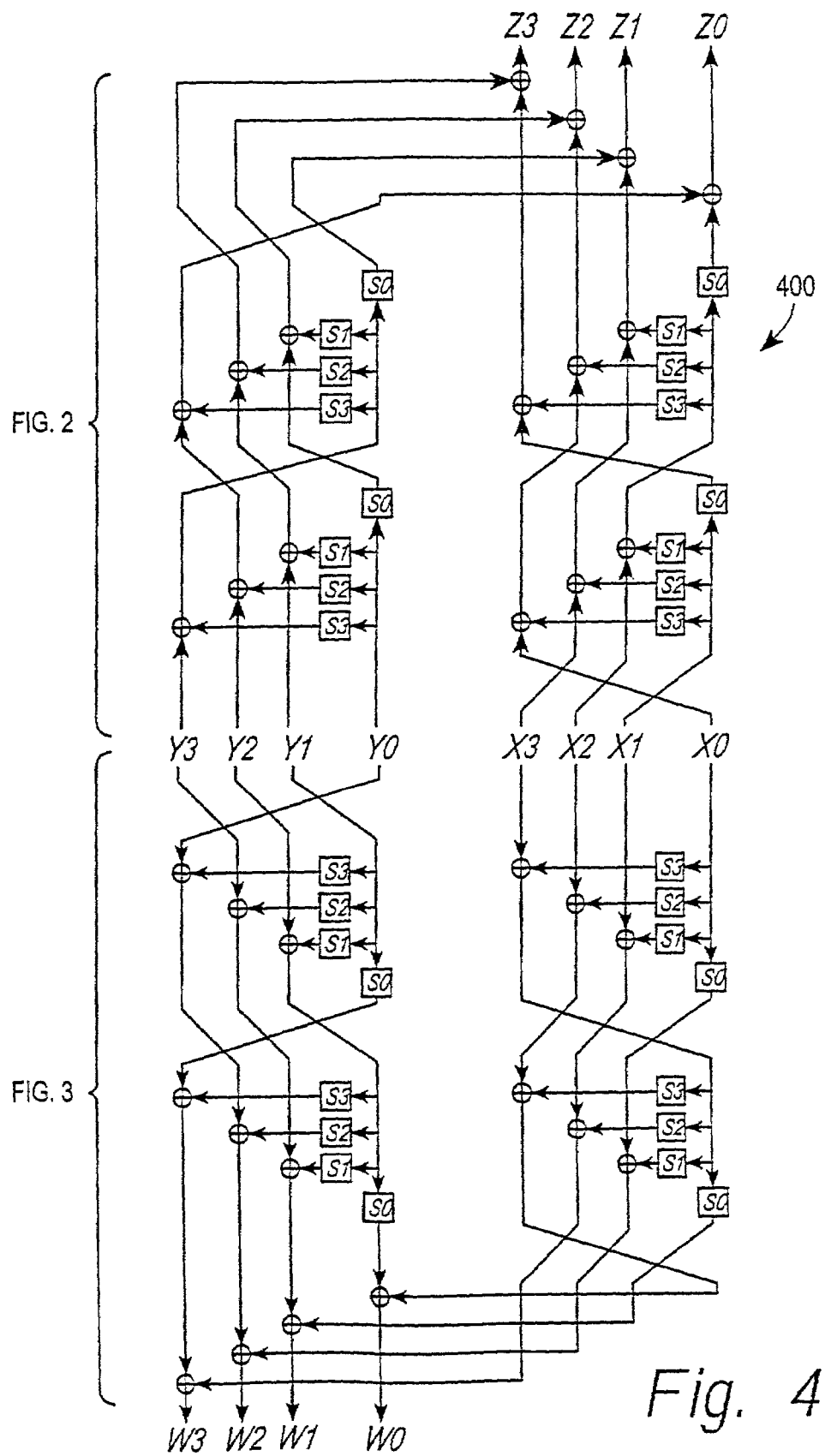
FIG. 4 is a computational graph diagram that illustrates a concatenation of FIG. 2 and FIG. 3.
Figure 5:
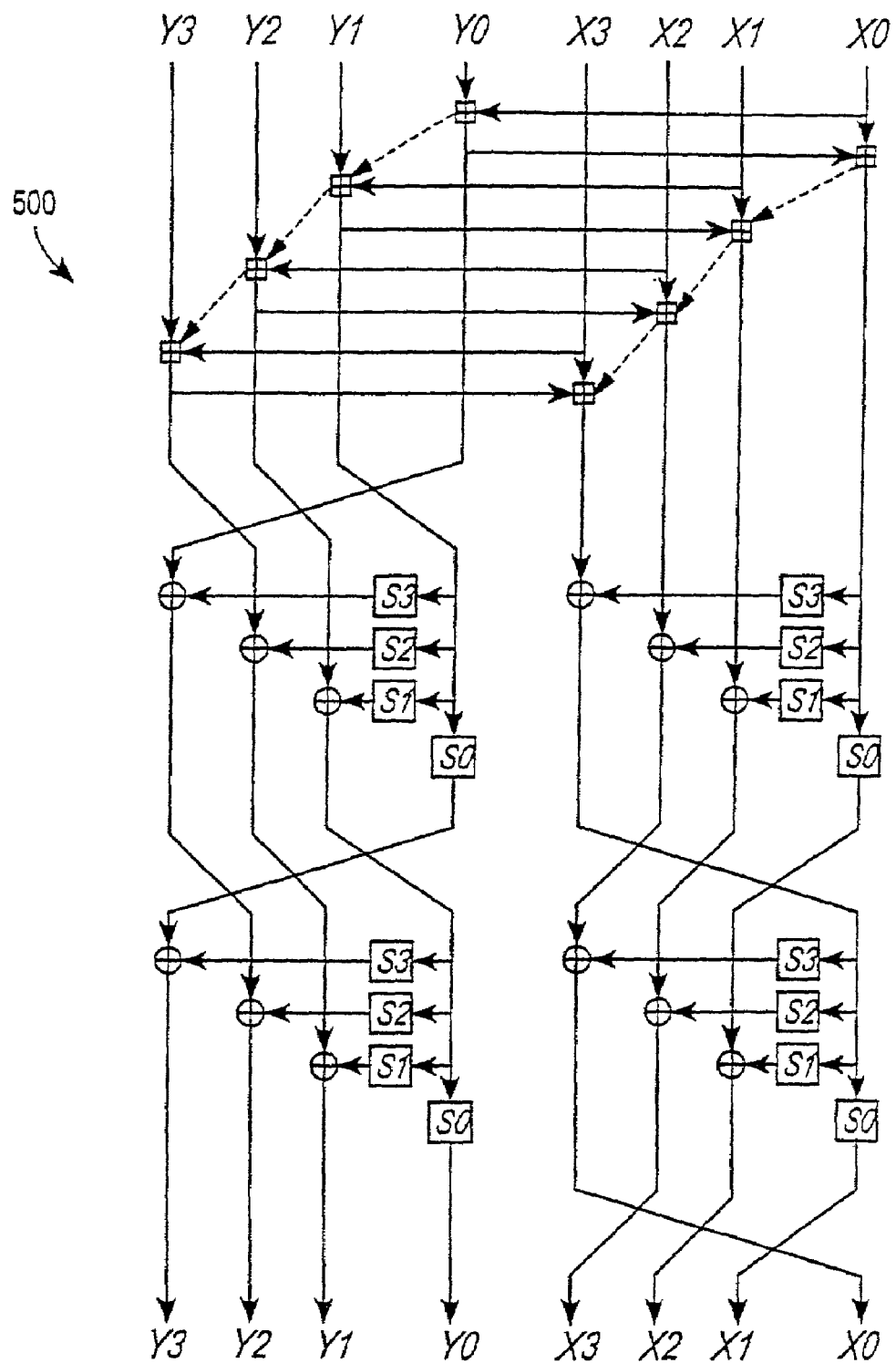
FIG. 5 is a computational graph diagram that illustrates one embodiment of the function $f \circ d$.
Figure 6:
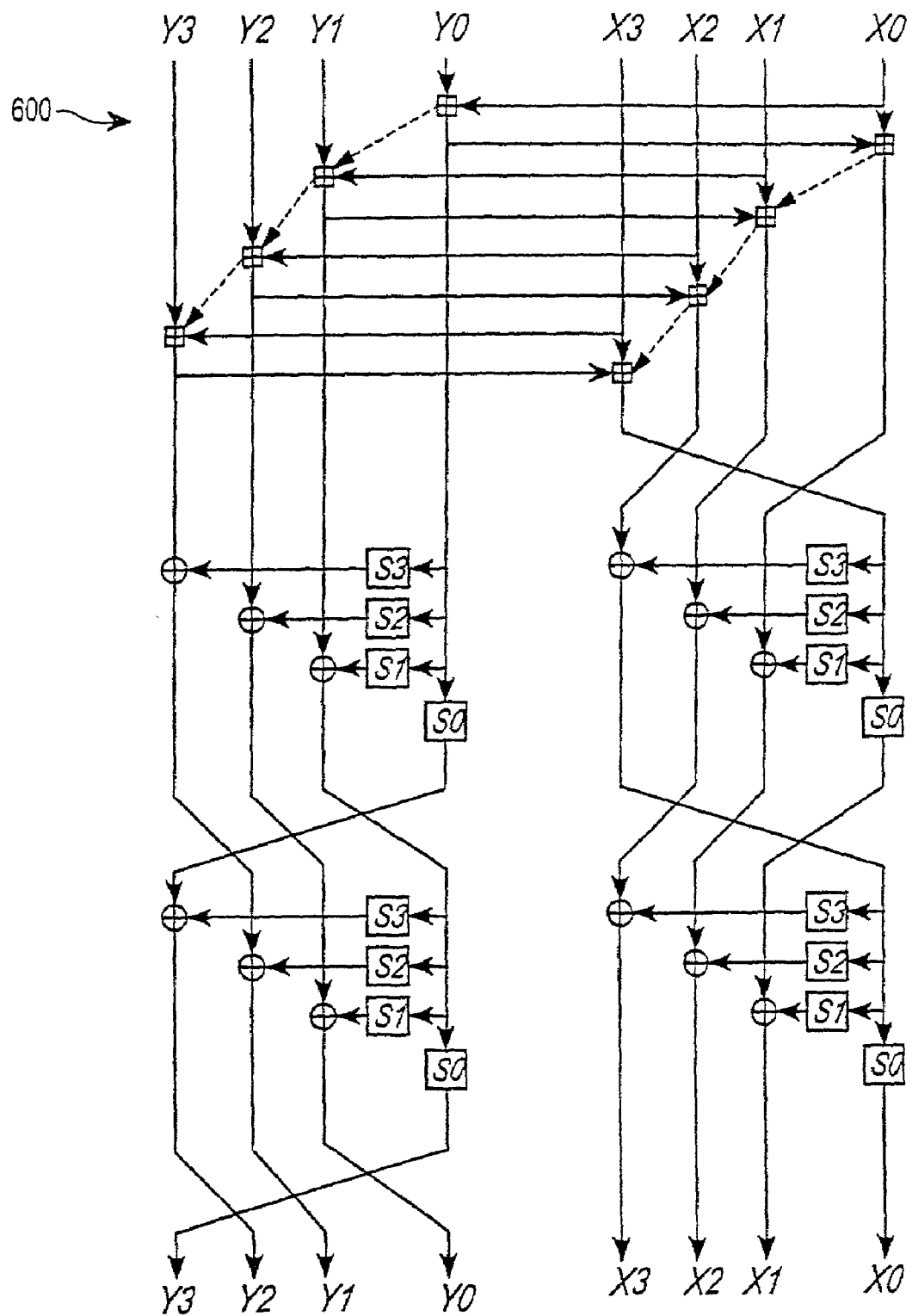
FIG. 6 is a computational graph diagram that illustrates one embodiment of the function $g \circ d$.

The filter function c is a bitwise exclusive or of x and y. The composition of c with f and g is shown in FIG. 2, FIG. 3. Specifically, FIG. 2 is a computational graph diagram that illustrates one embodiment of the function $c \circ f$, as indicated by reference numeral 200, and FIG. 3 is a computational graph diagram that illustrates one embodiment of the function $c \circ g$, designated by reference numeral 300. FIG. 4 is a computational graph diagram that illustrates a concatenation of FIG. 2 and FIG. 3 (reference numeral 400). FIG. 5 is a computational graph diagram that illustrates one embodiment of the function $f \circ d$ (reference numeral 500). FIG. 6 is a computational graph diagram that illustrates one embodiment of the function $g \circ d$, as indicated by reference numeral 600.

In FIG. 2, FIG. 3, FIG. 4, FIG. 5, and FIG. 6, inputs X0, X1, X2, X3 represent the bytes of x, where X0 is the least significant byte, X1 is the second least significant, and so on. Similarly, inputs Y0, Y1, Y2, Y3 represent the bytes of variable y, from least significant to next least significant, and inputs Z0, Z1, Z2, Z3 represent bytes of variable z. The function S depends only on the lowest n/4 bits of its argument, and can be viewed as four component functions S0, S1, S2, S3, as indicated by like labeled blocks in FIG. 2, FIG. 3, FIG. 4, FIG. 5, and FIG. 6. A key setup approach is defined such that component functions S0, S1, S2, S3 are invertible.

FIG. 2 and FIG. 3 illustrate how the output of the cipher disclosed herein is derived from the state of the leaf nodes using one embodiment of f, g, and c. The structures of f, g, and c are optimized, in this embodiment, to resist up and down attacks. Referring to FIG. 3, the variables at the top and bottom (z, w) represent two adjacent n-bit outputs of the cipher. The state at the middle of the network, represented by x, y, is the output of the function d for each of the leaves.

The manner in which the functions f and g use a substitution table is similar to that of the block cipher WAKE, which is described in B. Schneier, supra, at 400. However, in the approach described herein, greater parallelism and lower register usage is achieved by using the substitution table to modify the value of its argument.

Key Setup

Key setup consists of generating four invertible functions, and storing them in concatenated form in a substitution table. The substitution operation herein maps a single variable x to $x \oplus s(x)$, for some substitution table s that depends only on the lowest 8 bits of x. Thus, invertibility requires that the function mapping the lowest 8 bits of x to lowest 8 bits of $x \oplus s(x)$ be invertible. This is achieved by pseudo-randomly selecting an invertible function mapping 8 bits to 8 bits, then composing that function with the bitwise exclusive—or function. Invertible functions are pseudorandomly generated by swapping elements at random in the table, an approach similar to that of the RC4 next-state function.

Detailed pseudocode for this method follows, in which S0, S1, S2, and S3 are the substitution tables described above, 'key' represents the raw key, and i, j, k, and 'index' are integers between zero and 255. The symbol % denotes the modulus operator. The number of bytes in a key is represented here by the symbol $bytes_{13}$ in_key, which is a parameter of this method.

PSEUDOCODE FOR KEY SETUP 1. (initialize substitution tables to zero)
   for i from 0 to 255
   set S0[i] to 0
   set S1[i] to 0
   set S2[i] to 0
   set S3[i] to 0
   endfor
2. (set substitution tables to key-dependent permutations)
   for j from 0 to 255
   for i from 0 to 255
   set S3[i] to S2[i]
   set S2[i] to S1[i]
   set S1[i] to S0[i]
   set S0[i] to i
   endfor
   set index to j
   for k from 1 to num_passes
   for i from 0 to 255
   set index to index+(key[i % bytes_in_key]+S0[i]) % 255
   set tmp to S0[i]
   set S0[i] to S0[index]
   set S0[index] to tmp
   set tmp to S1[i]
   set S1[i] to S1[index]
   set S1[index] to tmp
   set tmp to S2[i]
   set S2[i] to S2[index]
   set S2[index] to tmp
   set tmp to S3[i]
   set S3[i] to S3[index]
   set S3[index] to tmp
   endfor
   endfor
   endfor
3. (set S0 equal to the xor of itself with the identity permutation)
   for i from 0 to 255
   set S0[i] to the value of S0[i] exclusive-ored with i
   endfor C language computer program source code for an example of a key setup approach is presented in Appendix A.

Performance

The functions f and g can each be computed in seven instructions on a general purpose CPU that can issue two instructions simultaneously, using five registers (holding x, y, z, a temporary variable, and a pointer to the substitution table). The theoretical encryption rate is about fifteen cycles per byte (using two execution units).

Approach for Key Updating with Segmented Stream Ciphers Using Key Updating Tree According to an embodiment, key updating is provided for use with an unreliable transport protocol, without vulnerability to run-up attacks, using a random-access key updating approach. A random-access key updating function is defined such that any future key can be computed efficiently, but finding previous keys is computationally infeasible. As a result, the sliding window of existing protocols is supported.

In this description, a key that is used to derive a sequence of keys, which may or may not be $K_0$, is termed the "master key." At any given moment, a current key $K_c$ is maintained by the system. Keys with $i<c$ are termed "previous keys," and keys with $i>c$ are termed "future keys."

In one specific approach, a key-updating tree is provided. The key-updating tree may be created and stored in memory of a processor that is carrying out cryptographic processing, and used as a basis for generating keys. Although illustrating the key updating tree graphically as a tree is convenient in this description, in practice the key updating tree may be represented as one or more tables, or any other form of abstract data structures or other programmatic constructs that may be convenient in a particular implementation.

Figure 7A:
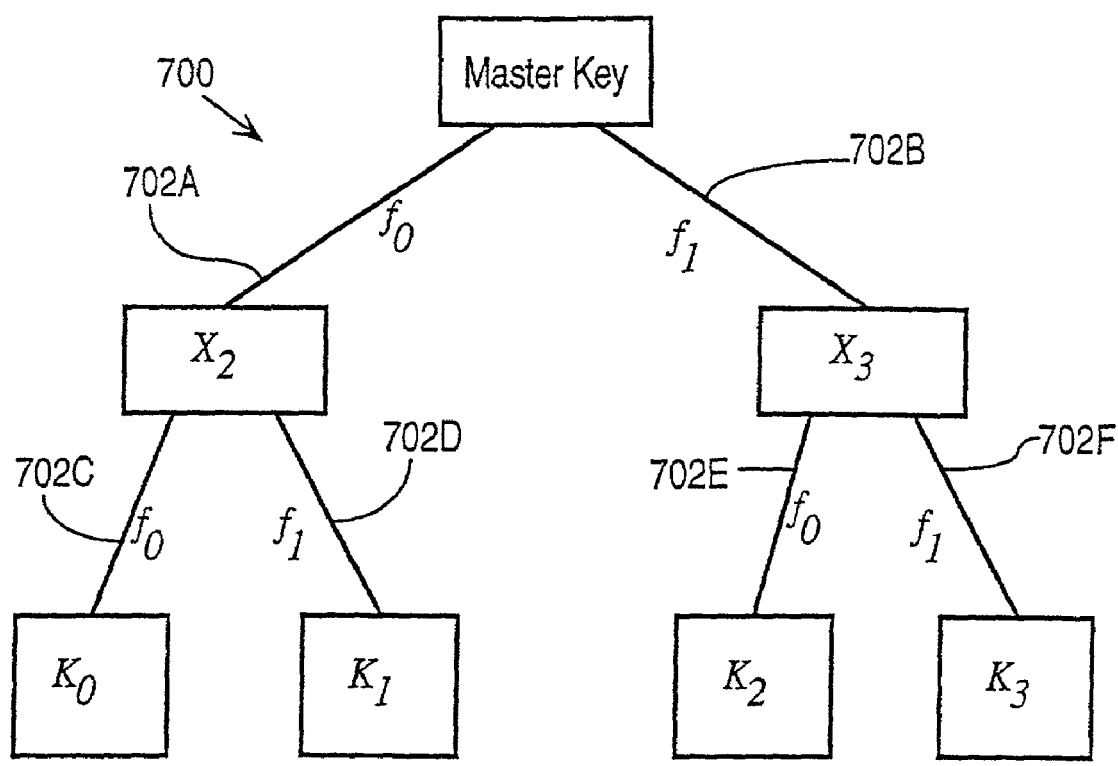
FIG. 7A is a diagram of a key-updating tree, according to one embodiment.

FIG. 7A is a diagram of a key-updating tree, according to one embodiment.

In this example embodiment, key updating tree 700 is a binary tree that comprises a root node designated as the Master Key node, a plurality outbound edges 702A, 702B, etc., leading to internal nodes and to leaf nodes. Internal nodes, designated $X_2$, $X_3$, etc., lead to leaf nodes designated $K_0$, $K_1$, etc. Thus, the root of the tree 700 is associated with a master key, and leaf nodes are associated with keys in a key updating sequence. Each outbound edge 702A, 702B, etc., is associated with a distinct one-way function $f_0$, $f_1$. Values of the tree are defined by computing down from the root.

Internal state information is maintained. In an embodiment, the internal state information describes a path from the root to a single leaf.

A binary tree representation is not required; multi-way tree representations may be used.

Figure 7B:
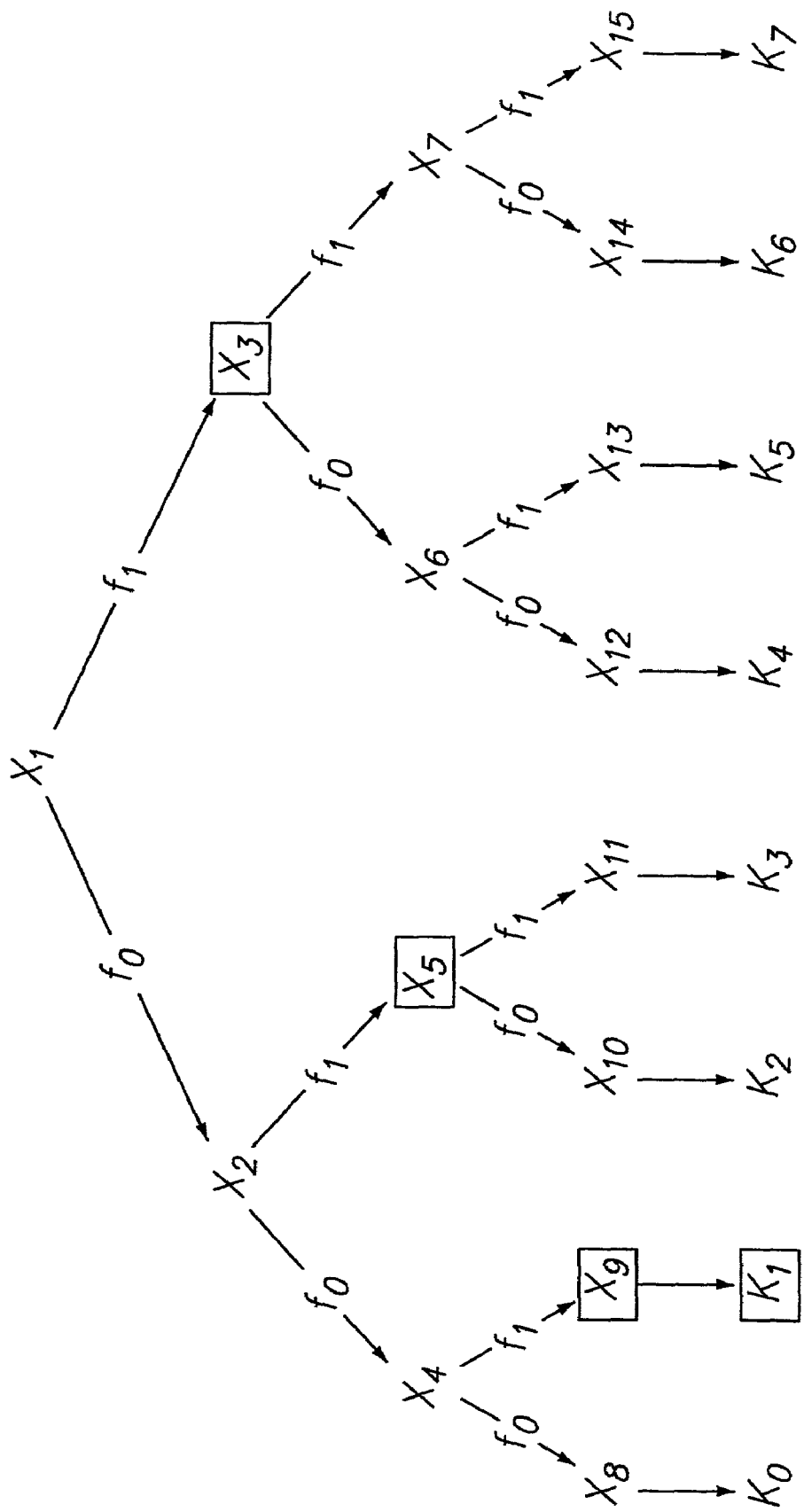
FIG. 7B is a diagram of an example key-updating tree, for a random-access key updating sequence with eight keys.

FIG. 7B is a diagram of an example key-updating tree, for a random-access key updating sequence with eight keys. In this example embodiment, $X_i$ denotes the $i^{th}$ internal element, and $K_1$ denotes the $i^{th}$ key.

In this embodiment, the $i^{th}$ key is defined as $K_i = X_{2^{t-1}+i}$ for $0 \leq i < 2^{t-1}$, where $X_i \in \{0,1\}$ is defined as $$X_i = \begin{cases} f_0(X_{\lfloor i/2 \rfloor}) \\ f_1(X_{\lfloor i/2 \rfloor}) \end{cases}$$

where functions $f_0$ applies when i is even, and $f_1$ applies when i is odd, for $0 \leq i < 2^t$.

The root value $X_0 = K$ is the master key of the cipher, i.e., the value that is used as input to the cipher process or algorithm. The elements $\{X_0, X_1, \ldots, X_{2^t-1}\}$ are the nodes of a binary tree that is defined by the one-way functions $f_0, f_1 \{0,1\}^n \rightarrow \{0,1\}$.

Figure 8A:
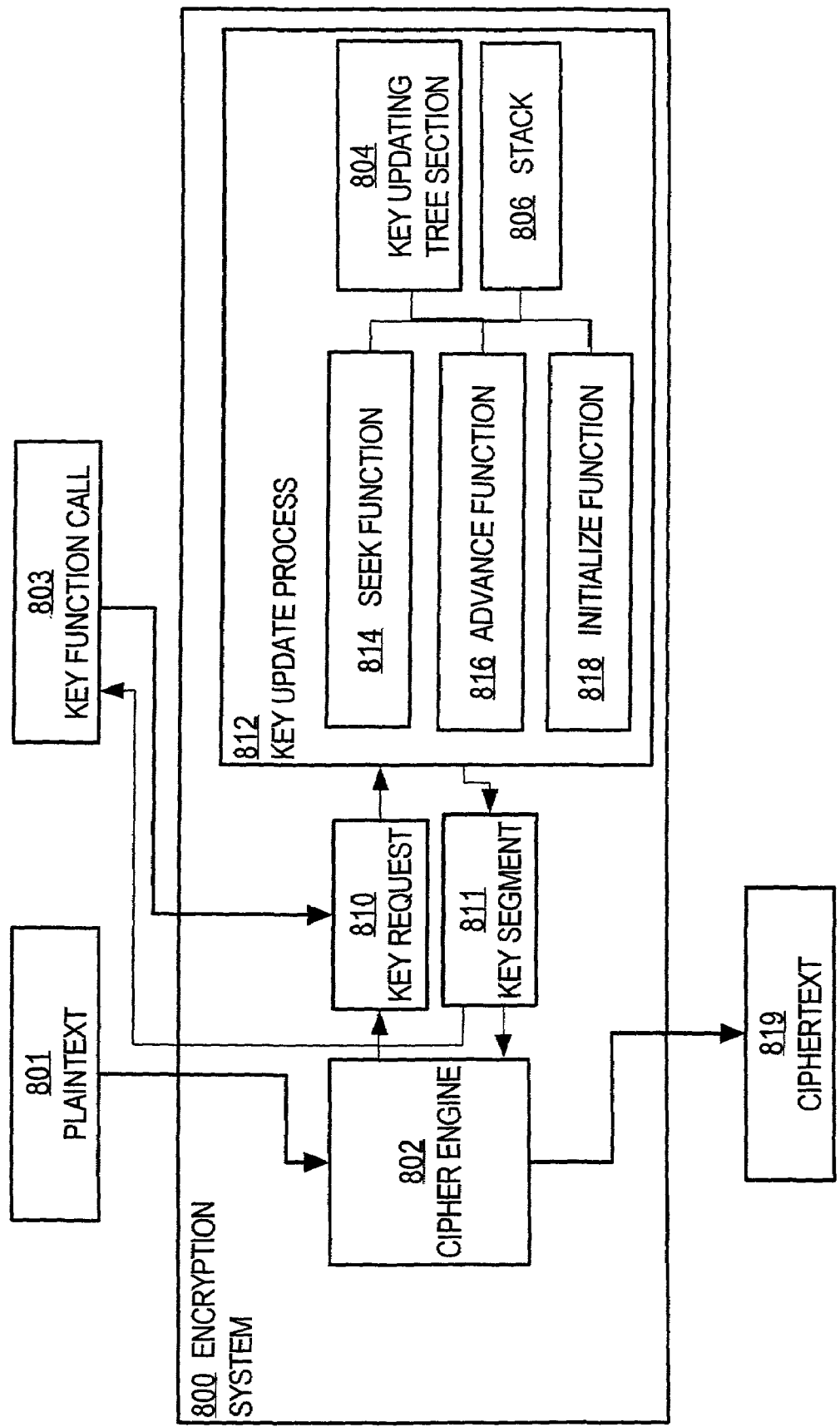
FIG. 8A is a block diagram of a cipher system that may be used in an implementation.

FIG. 8A is a block diagram of a cipher system that may be used in an implementation.

Cipher system 800 generally comprises a cipher engine 802 that is communicatively coupled to a key update process 812. The key update process 812 manages a section of a key updating tree 804 and a stack 806. The key update process also stores the index value c of the current key in memory.

In one embodiment, key update process 812 further comprises a Seek function 814, Advance function 816, and Initialize function 818. The functions 814, 816, 818 operate on values in the stack 806 and provide all operations needed to provide a cipher with random-access key updating. An application programming interface that includes the Seek function and Advance function may be configured to provide external applications, processes or algorithms with a way to obtain key segments.

In one aspect of operation, plaintext 801 is provided to the cipher system 800 and is received at the cipher engine 802. The cipher engine determines that it needs to obtain one or more segments of keystream to encipher the plaintext.

Accordingly, the cipher process 802 generates one or more key requests 810 and sends the key requests to the key update process 812. The key update process 812 determines one or more key segments 811 that are responsive to the key request, and sends the key segments 811 to the cipher engine 802 as output.

Using the key segments 811, the cipher engine 802 enciphers the plaintext 801 to result in ciphertext 819, which is the output of the cipher system 800. Such output may be delivered to an external system, or returned as part of a function call parameter.

Alternatively, a key function call 803 of an external program or process directly issues a key request 810 to key update process 812. This aspect of operation may be exposed to other programs or processes, for example, through an application programming interface (API).

Key updating as disclosed herein need not update a key after each message sent. Alternatively, a key may be associated with a given time period, such as a day, a portion of a day, etc.

Stack 806 comprises information identifying t or fewer nodes in the tree. The index c, which is the node number of the current key, is also stored, e.g., in association with the stack. Elements in the stack 806 store values that identify child nodes of the internal nodes on a path from the current key to the root of the tree, except that a sibling node of the current key is not stored if it precedes the key. As an example, for the state tree of FIG. 7B, in which the current key is $K_1$, the stack stores values identifying the node locations or node numbers of nodes $X_3$, $X_5$, and $X_9$. All later keys are computable from such state information. In an implementation, stack 806 may be constructed as an array, linked list, table, etc. Further, a stack structure is not required; any other ordered association of a plurality of data values may be substituted for a stack.

The Initialize function 818 computes the initial values on the stack. Table 1 presents a pseudocode example of Initialize function 818, wherein K is the master key, X is a temporary key value, h is the height of the tree in levels, S is the stack, and $f_0$, and $f_1$ are distinct one-way or pseudo-random functions.

TABLE 1

INITIALIZE FUNCTION

X ← K
for i from 1 to h do
    push (S, $f_1$ (X))
    set X←$f_0$ (X)
end for

The Advance function 816 computes the next key in the sequence. Table 2 presents a pseudocode example of Advance function 816.

TABLE 2

ADVANCE FUNCTION

Given the current stack S, outputs the next key and updates
the stack so as to discard used values. The pop( ) function is
expected to zero-ize the value that it returns.
    set X ← pop(S)
    while X is not a leaf do
        push (S, $f_1$ (X))
        set X←$f_0$ (X)
    end while
    output contents of X as key In the embodiment of Table 2, given the current stack S, the Advance function 816 outputs the next key and updates the stack so as to discard used values. By discarding used values, the Advance function 816 removes all state information from the stack that could be used to compute the current value. The term "removes state" means that memory locations that contained such state information are set to zero, or another specified value. In particular, the pop( ) function that is called in the Advance function is required to set the element of the stack for which it returns a value to zero, after such value is returned. The advance function is used to move the replay window forward.

Repeatedly invoking the Advance function 816 is equivalent to carrying out a pre-order traversal of the trees 700, 710, with intermediate state values stored on the stack.

In general, Seek function 814 is used to generate the keys needed to process packets. The Seek function 814 computes a future key, but does not discard the current key. To seek to an index d, where d>c, and c is the current index, the Seek function 814 finds the internal node having the highest node number that is an ancestor of nodes d and c. The key is computed by applying function $f_0$ and/or $f_1$ to walk down the tree to node d. This operation requires no more than $\lfloor lgl \rfloor$ evaluations of $f_0$ and/or $f_1$.

Table 3 presents a pseudo-code description of an example of the Seek function 814. FIG. 9B is a flow diagram of an example of the Seek function, and its use is illustrated in APPENDIX C, which is described further herein in a later section.

TABLE 3

SEEK FUNCTION

Given the current stack S, and the index i of a future key,
computes the value of the $i^{th}$ key and updates the stack so
that its value is appropriate for that index.
set j to i
while the node number of X is not equal to j do
    set X ← pop(S)
    set j ← j/2
end while
while X is not a leaf do
    if j is even then
        set X←$f_0$ (X)
        push (S, $f_1$ (X))
    else
        set X←$f_1$ (X)
        push (S, X)
    end if
end while
output X To further enhance the security of the system, any key management method that is used to establish the master key should discard that key after providing it to cipher process 802.

Using this configuration, 2l-2 one-way function evaluations are needed in order to produce all l segment keys. Thus, roughly two such evaluations are needed for each segment.

Figure 7C:
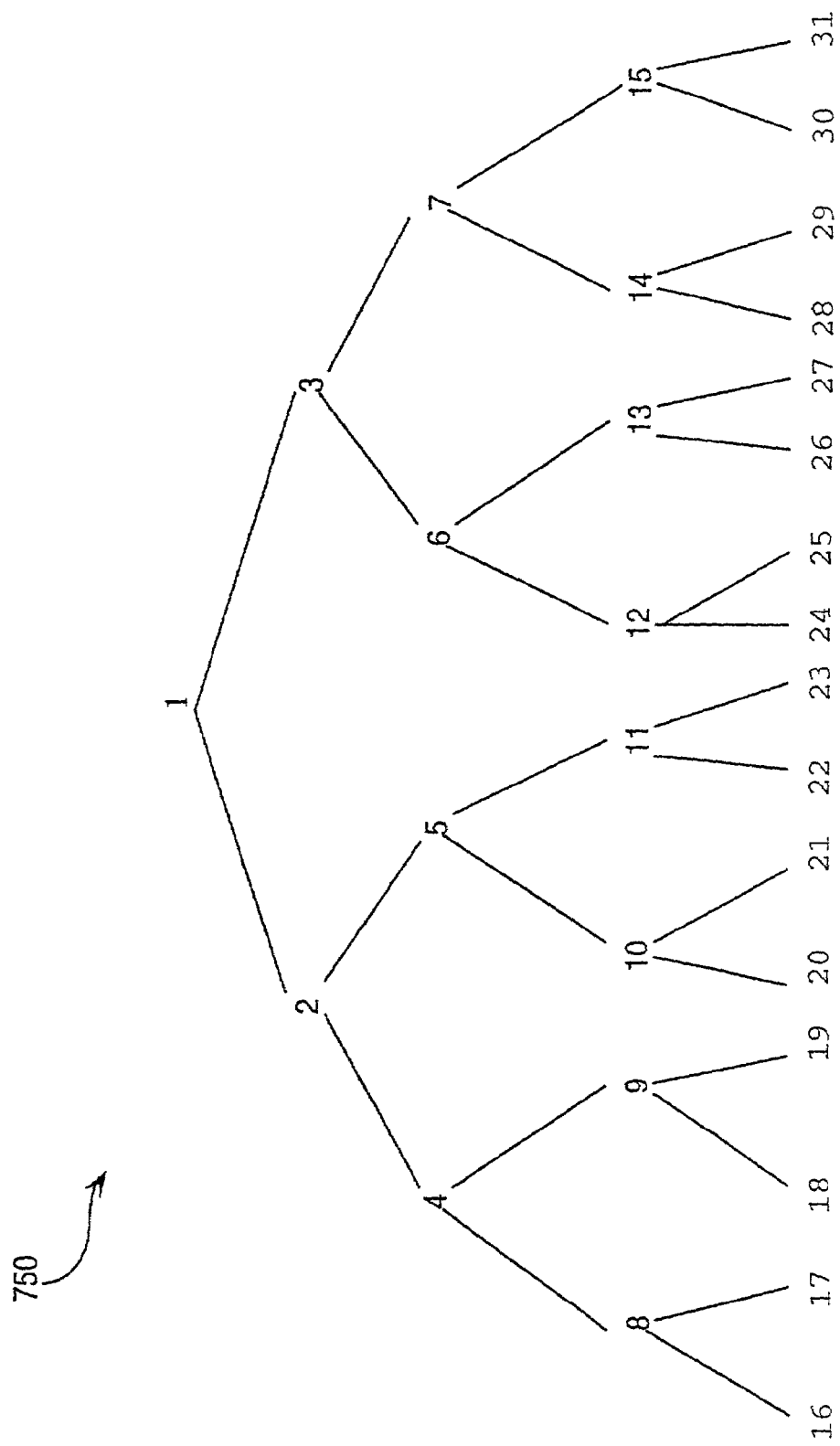
FIG. 7C is a diagram of an example key-updating tree having a height of five. In this example, tree 750 comprises thirty-two leaf nodes. Table 4 shows stack values and node outputs as internal state values evolve during computation of a key sequence. The Output column contains the node numbers of the nodes used in the key updating sequence. The value S[i] denotes the $i^{th}$ element of an array that implements the stack; such elements store node numbers of nodes in the tree, except that a value of "0" indicates that state value is removed.

FIG. 7C is a diagram of an example key-updating tree having a height of five. In this example, tree 750 comprises thirty-two leaf nodes. Table 4 shows stack values and node outputs as internal state values evolve during computation of a key sequence. The Output column contains the node numbers of the nodes used in the key updating sequence. The value S[i] denotes the $i^{th}$ element of an array that implements the stack; such elements store node numbers of nodes in the tree, except that a value of "0" indicates that state value is removed.

TABLE 4

EXAMPLE STACK CONTENTS AND OUTPUT

| S[0] | S[1] | S[2] | S[3] | Output (Node Number) |
|------|------|------|------|----------------------|
| 3    | 5    | 9    | 8    | 8                    |
| 3    | 5    | 9    | 0    | 9                    |
| 3    | 5    | 0    | 0    | 10                   |
| 3    | 11   | 0    | 0    | 11                   |
| 3    | 0    | 0    | 0    | 12                   |
| 7    | 13   | 0    | 0    | 13                   |
| 7    | 0    | 0    | 0    | 14                   |
| 15   | 0    | 0    | 0    | 15                   |

Figure 9A:
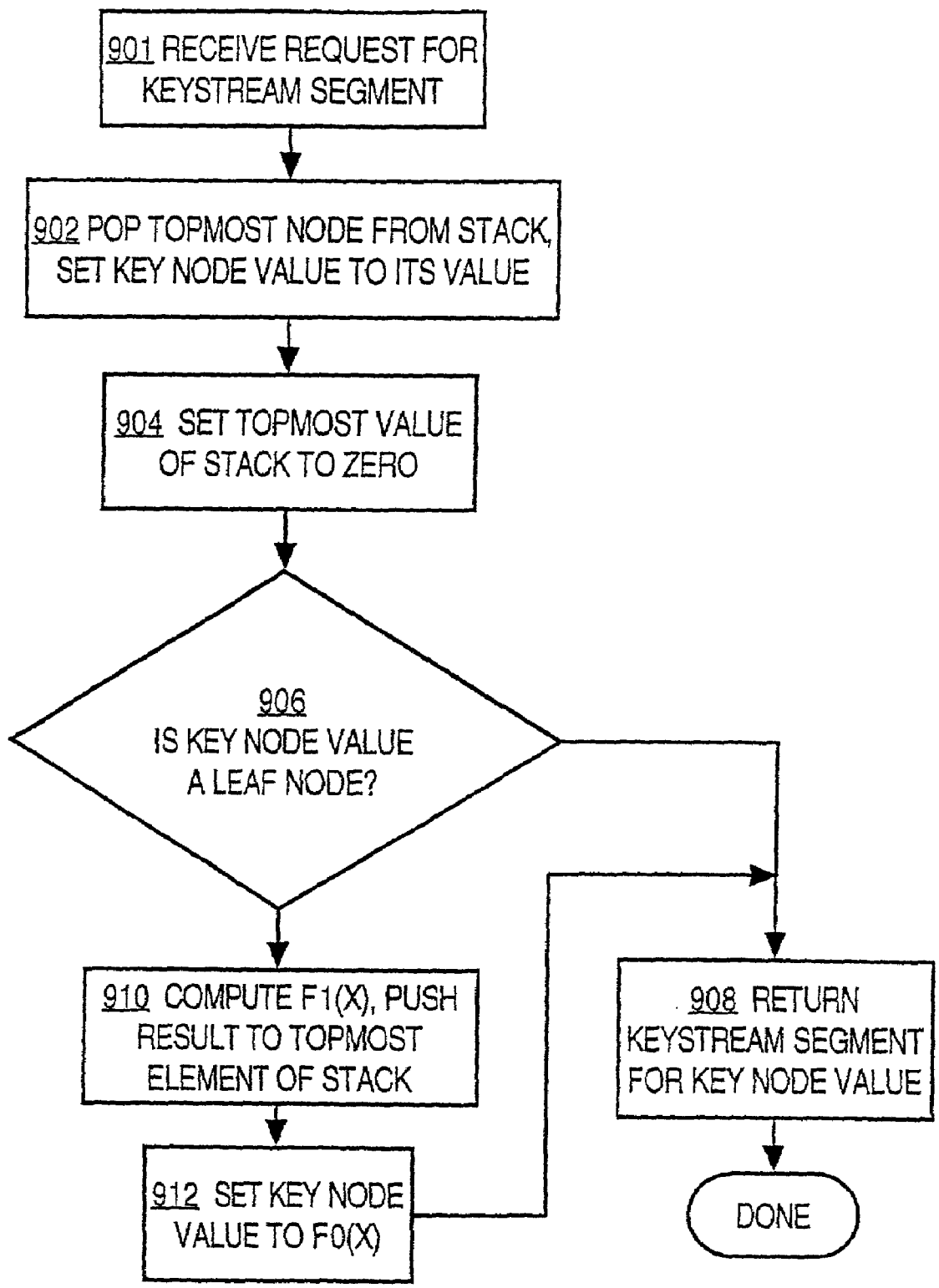
FIG. 9A is a flow diagram of an embodiment of the Advance function.
Figure 9B:
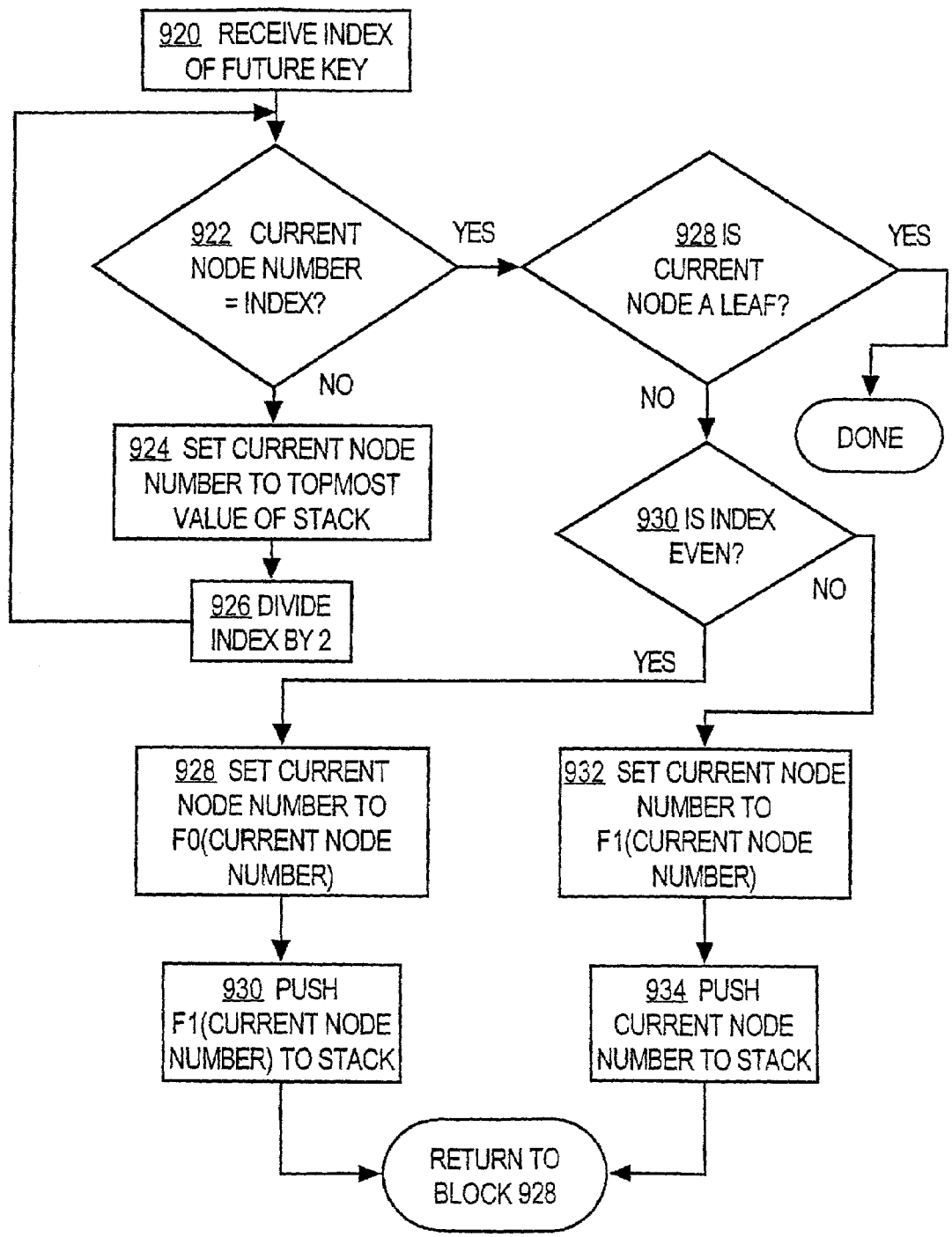
FIG. 9B is a flow diagram of an embodiment of the Seek function.

FIG. 9A is a flow diagram of an embodiment of the Advance function 816. By applying the Advance function of key update process 812 as described above to the example tree of FIG. 7C, the values shown Table 3 are developed as follows.

Following initialization, the stack 806 holds the following values, from the bottom of the stack to the top: 3, 5, 9, 8. Such values may be determined using the Initialize function 818.

At block 901, a request for a segment of keystream is received, as also illustrated by key request 810 of FIG. 8.

In response, at block 902, the topmost value on the stack is popped and a key node value is set to the popped value. Thus, the key node value is set to "8," referring to node 8 of the tree 750 of FIG. 7C. Further, the topmost value of the stack is set to "0", as indicated by block 904. In an embodiment, block 902 and block 904 may be implemented in a single pop function.

In block 906, a test is carried out to determine whether the key node value represents a leaf node. For node 8, the test is true. Therefore, control passes to block 908, in which the segment of key stream represented by node 8 is output or returned.

When a subsequent key request 810 is received, a similar process is carried out, except that the value "9" is now at the top of the stack. Therefore, the segment of keystream represented by node 9 is returned as output.

When a third key request 810 is received, the value "9" is popped from the top of the stack. However, node 9 is not a leaf node. Therefore, control passes to block 910, in which the value $f_1(X)$ is computed and pushed onto the top of the stack. In block 912, the key node value is set to $f_0(X)$. Applying $f_0(X)$ is equivalent to walking down the left branch from node 9 to arrive at node 10. Therefore, X is set to "10", and the segment of keystream represented by node 10 is returned as output.

Memory Optimization

Figure 8B:
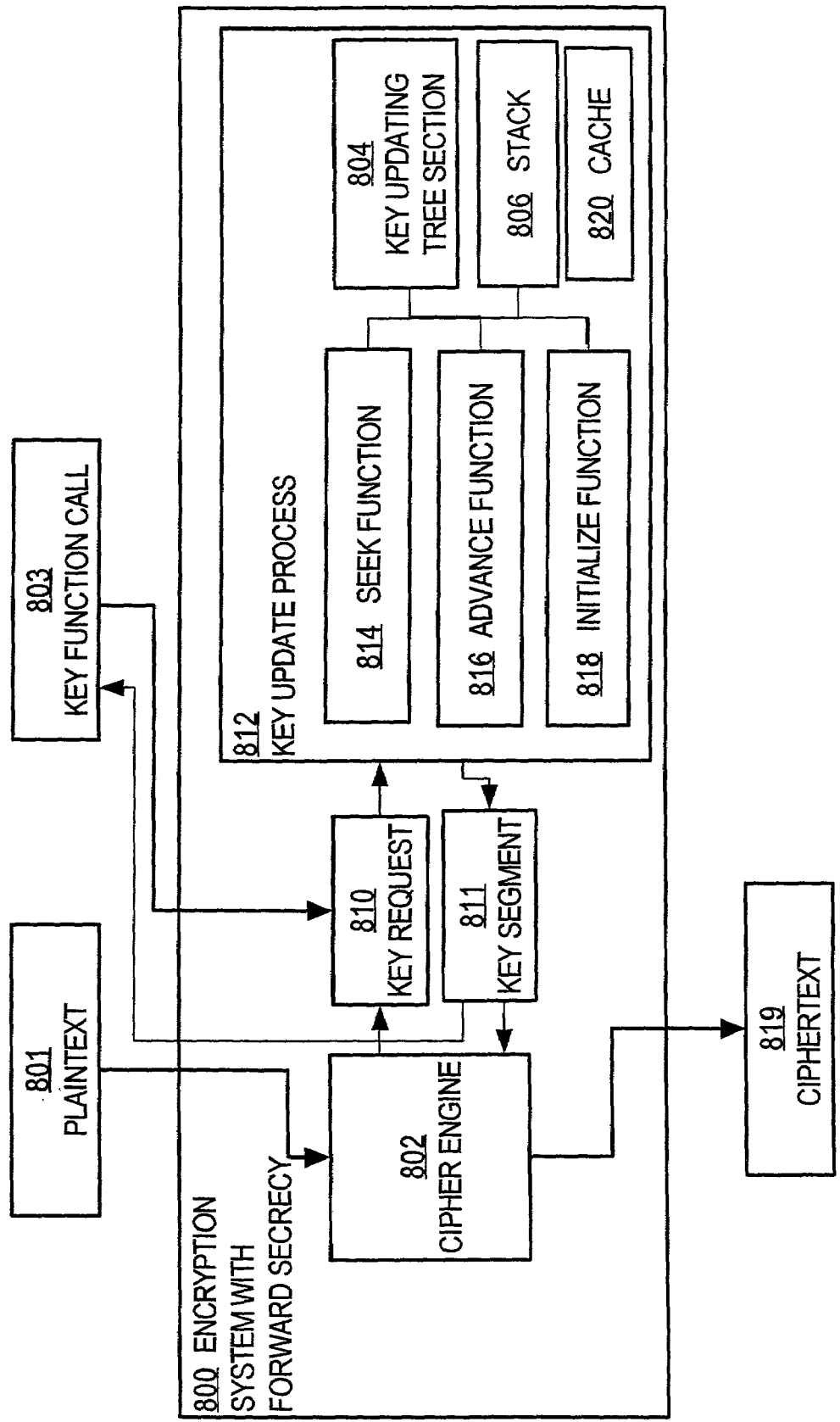
FIG. 8B is a block diagram of a system that includes a cache.

To provide better performance in processing out-of-order packets, intermediate values that are computed during the generation of out-of-order keys can be cached. FIG. 8B is a block diagram of a cipher system that includes a cache 820 that is communicatively coupled to key update process 812. For example, by increasing the amount of storage from h to h+w−1, all possible intermediate values that are generated, when the keys are no more than w keys out of order, may be stored.

One specific implementation is guided by the observation that any sequence of w or fewer keys is on a subtree of the key-updating tree of height ⌈lg w⌉+1. Fixed storage space is reserved for a pointer-based binary tree in an amount equal to the size of the subtree. The tree comprises nodes whose values have been set to zero previously, and nodes whose values have not yet been used. As a result, neither data copying nor memory allocation is required, providing a performance benefit whenever the packet stream is disordered. Further, enough memory is available to store several keys.

Security Issues

The approach disclosed herein is highly secure. In particular, no previous keys are computable using $f_0$ and $f_1$ given the current value of the state retained by the traversal algorithm. While a previous key would be computable using $f_0$ and/or $f_1$ given one of its ancestors or itself, in the approach herein, for each value X stored on the stack by the Initialization, Seek, or Advance functions, no ancestor of X is stored. Since the current key is merely the contents of the node identified in the top element of the stack, no ancestor of the current key is ever stored. The Advance function discards each key as it is used, so no previous key or any ancestors of a previous key are stored. Further, since an adversary A cannot distinguish the function $f_0$ or $f_1$ from a random function in polynomial time, a cipher that uses the keys associated with the leaves of a key updating tree, from left to right, to encrypt a sequence of messages provides forward security.

Since many keys are generated by key updating, a key updating method may be viewed as more susceptible to key collision attacks. Such attacks may use the birthday paradox to reduce the number of trial encryptions needed to find an unknown key, by considering all of the collisions in two sets of ciphertexts, one of which is the set gathered from eavesdropping and the other of which was generated using known, random key values. If such an attack is possible, and if l keys are used, then up to lg l bits of effective keysize are lost. Accordingly, in one embodiment, the segment keys are at least lg l bits larger than the desired effective key size.

Another concern is that each iteration of a pseudo-random function reduces the size of the set of possible keys by about 1/e. As a result, a loss in effective keysize no greater than lgj bits, for all j>2. Accordingly, in conventional key updating, the final key is about lg l bits less secure than its nominal key size. However, the approach disclosed herein provides better protection against this attack, because the path sizes from the master key to the keys in the sequence are logarithmic in the length l of that sequence. Thus, with the approaches herein, the loss of effective key size is no greater than lg lg l.

It also possible that a cipher using the approaches herein could be subjected to time-memory tradeoff attacks that invert the one-way function. Such attacks can remove up to one-third of the effective key size. Accordingly, in an embodiment, the segment keys are made at least one-third larger than the desired effective key size.

Applications of Forward Security

In many cases, the greatest threat to a secret key system is direct loss, through improper manipulation of software functions, operation system insecurity, or physical insecurity of the system, the failure of tamper-resistant hardware or software, user negligence, or maliciousness on the part of trusted users. In these cases, forward security can substantially improve the system.

Embodiments are applicable to generating keys for shared use among members of a group. When a secret key is shared among a group of users, rather than a pair of users, the chance that it can be acquired by an untrusted party increases. A cipher with forward secrecy can limit the effect of a compromised key. In one embodiment, the approaches disclosed herein are used for generating keys for groups, when the use of the group key is serialized. In this context, serialized usage means that only one user in the group can encrypt messages using the key at any particular time. An example of serialized usage occurs in multicast communications, and other contexts in which one group member sends a message to many other group members.

Effective group security systems normally have a method to recover from the compromise of a group key, or to respond to group members who join or leave, by generating a new key that is known only to the current members of the group. Such methods can use the forward secret cipher described herein as their key encryption cipher.

The Internet security protocol (IPSEC) provides network layer security services for computer devices that communicate using Internet Protocol over public networks. IPSEC is defined in S. Kent et al., IETF Request for Comments (RFC) 2401, RFC 2402, and RFC 2406. IPSEC services include authentication, data confidentiality, and data integrity.

IPSEC can be used either in transport mode or in tunnel mode. Transport mode is most typically applied to protect a network link between two hosts, and is obtained by adding an encapsulating payload (ESP) to data packets, or by adding an authenticating header (AH) after the IP header of data packets to provide end-to-end protection.

Tunnel mode is normally used to secure communications of a remote access client to a server. In tunnel mode, the ESP or AH header is added to the original packet, which is then encapsulated with a new IP header. IPSEC tunnel mode allows IPSEC to be provided by intermediate hosts or security gateways when end-to-end protection is not possible. For example, an IPSEC virtual private network (VPN) can link remote sites of an organization, and the cryptographic data confidentiality service of ESP is used to provide privacy on the Internet links between the sites. Use of IPSEC to support VPNs is a significant application because great cost savings may be realized in replacing fixed private links with VPN-protected public network links.

Another practical application of IPSEC involves communication with mobile users. A mobile user may connect to a server of an affiliated organization over the Internet. An IPSEC tunnel, which comprises a pair of IPSEC Security Associations (SA's), is created between the remote access client and a security gateway or firewall at the server organization.

Cipher block chaining or a stream cipher can be used to produce the ESP header. According to an embodiment, as described in the next section, forward secret cipher block chaining or forward secret counter mode are used to generate the ESP header for a packet flow that is secured using IPSEC. In each case, the maximum allowed packet reorder ("replay window size") may be approximately 64, and the maximum number of packets that can be encrypted under a single key is $2^{32}-1$. Typical packet sizes may range from 20 bytes to 1500 bytes, and sizes up to 64,535 bytes may be used under Internet Protocol version four (IPv4).

Another use for random-access key updating as disclosed herein is protecting communication between a highly trusted computer system, such as a set of security servers, and a less trusted system, e.g., a laptop. In some circumstances it may be acceptable to require the less-trusted system to use key updating, while allowing the trusted system to store the master key. In this case, random-access key updating allows the trusted systems to efficiently compute the current key. If there are many laptops, the servers can compute the current key of any laptop without maintaining the current key of any laptop.

Random access key updating with forward security as disclosed herein also is applicable to the authentication of system logs. In this approach, a log auditor could generate the authentication keys in arbitrary order, removing the need for sequential processing. When a log contains a large number of entries, questionable entries could be checked quickly and at random without regard of their temporal positioning in the log. Further, the log could be checked using parallel processing approaches.

Specific Example Application: Forward Secret Counter Mode and Forward Secret Block Chaining Mode Block ciphers normally can operate in a counter mode and a cipher block chaining mode. In counter mode, sequence numbers are used as the input to the cipher. Instead of using the output of an encryption algorithm to fill a register, the input to the register is a counter. After each block encryption, the counter increments by a constant. In block chaining mode, the input to the cipher is XOR'd with the XOR of all previous ciphertext blocks.

The approaches described herein are applicable to counter mode and block chaining modes. In one embodiment, a forward secure counter mode comprises counter mode in which the key is determined by key updating as described herein. In another embodiment, a forward secure cipher block chaining mode comprises cipher block chaining mode in which the key is determined by key updating as described herein.

In forward secure counter mode and forward secure block chaining, the block cipher underlying the mode defines the one-way functions that are used in key updating. Encryption of P under the block cipher encryption function, using the key K, is denoted as $e(K, P)$. The functions $f_0$ and $f_1$ are defined as $f_0(X)=e(A_0,X) \oplus X$ and $f_1(X)=e(A_1,X) \oplus X$, where $A_0$ and $A_1$ are fixed keys that are used only in the one-way functions, and $\oplus$ denotes bitwise binary addition. The key-updating tree has a height of 32 levels.

The fixed keys may be specified as additional parameters in a function call, or may be fixed for all uses of forward secure counter mode and forward secure block chaining. Using fixed key values for all uses of forward secure counter mode and forward secure block chaining has the advantage of simplicity, but some effective key size is given up to pre-computation attacks.

The keystream segment corresponding to the sequence number j is generated by using the $j^{th}$ key in the sequence in counter mode, where the block cipher inputs use a fixed offset value. Symbolically, the $j^{th}$ key or keystream segment is:

$$e(K_j,r)|e(K_j,(r+1) \bmod 2^w)|e(K_j,(r+2) \bmod 2^w)| \ldots ,$$

where $K_j$ is the $j^{th}$ key in the random access key updating sequence, w is the width of the block cipher in bits, and r is the w-bit fixed offset value.

In one specific approach, forward secure counter mode is used within the IPSec ESP, using a stream cipher ESP such as 128-bit encipherment with the cipher RIJNDAEL, developed in Belgium and proposed for adoption as the United States Advanced Encryption Standard (AES). This is only one example, and any other suitable block cipher can be used. In this specific approach, the effective key size is reduced by about $\lg 32=5$ bits, due to the range-compression effect. While the reduction of the effective key size from 128 to 123 bits is not ideal, it is not considered significant in current practice.

APPENDIX C provides example source code of an implementation, including tree traversal processes, for forward secret counter mode.

Hardware Overview

Figure 10:
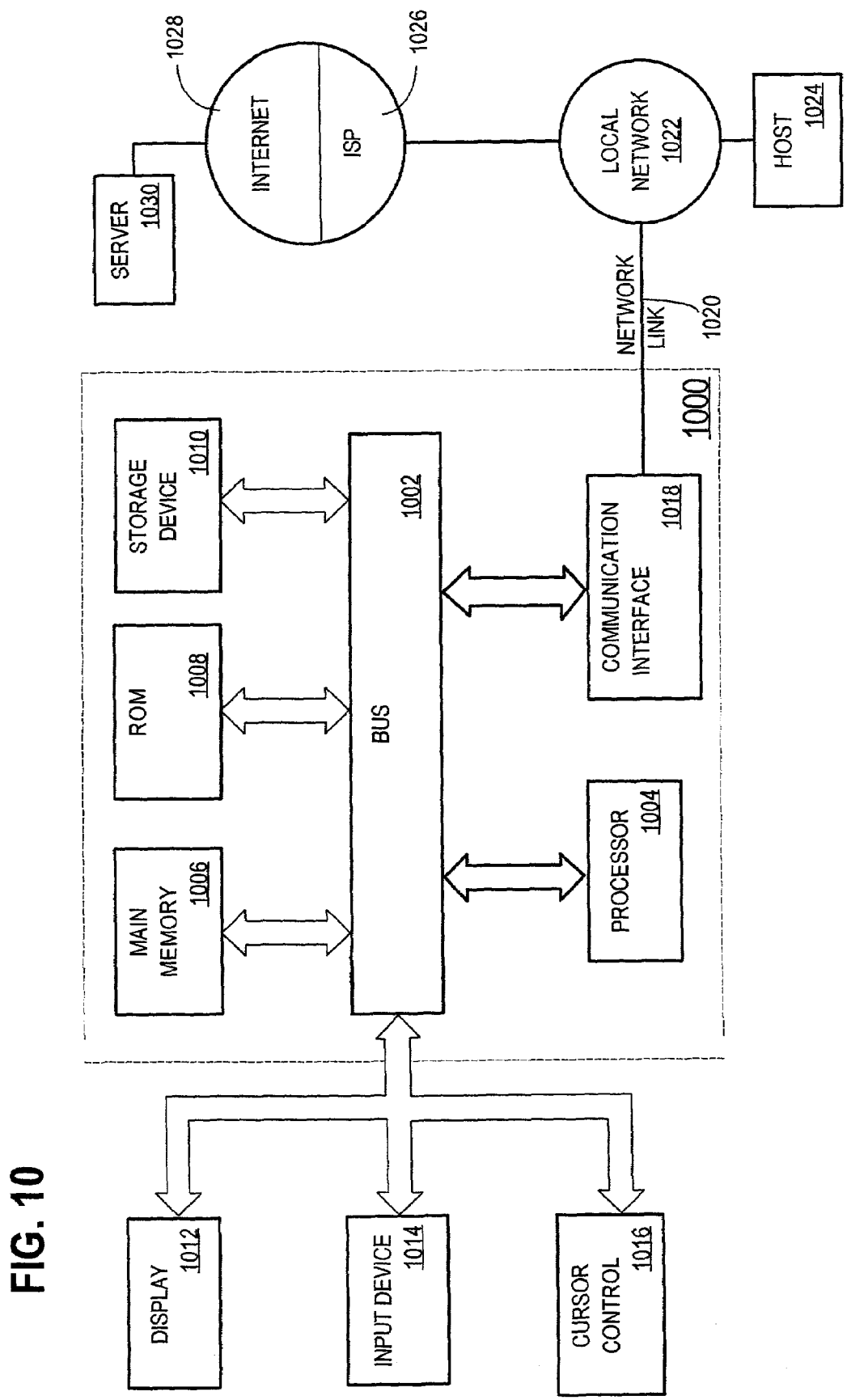
FIG. 10 is a block diagram that illustrates a computer system upon which an embodiment may be implemented.

FIG. 10 is a block diagram that illustrates a computer system 1000 upon which an embodiment of the invention may be implemented.

Computer system 1000 includes a bus 1002 or other communication mechanism for communicating information, and a processor 1004 coupled with bus 1002 for processing information. Computer system 1000 also includes a main memory 1006, such as a random access memory ("RAM") or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory ("ROM") 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube ("CRT"), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for performing a stream cipher encryption method and apparatus that provides forward secrecy, and a method of generating an arbitrary segment of keystream. According to one embodiment of the invention, a stream cipher encryption method and apparatus that provides forward secrecy are provided by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infrared transmitter to convert the data to an infrared signal. An infrared detector can receive the data carried in the infrared signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network ("ISDN") card or a modem to provide a data communication connection to a corresponding type of telephone line. As another example, communication interface 1018 may be a local area network ("LAN") card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider ("ISP") 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for carrying out a stream cipher encryption method and apparatus that provides forward secrecy.

The received code may be executed by processor 1004 as it is received, and/or stored in storage device 1010, or other non-volatile storage for later execution. In this manner, computer system 1000 may obtain application code in the form of a carrier wave.

OTHER EMBODIMENTS AND MODIFICATIONS

Accordingly, a stream cipher encryption method and apparatus that provides forward secrecy has been described. The disclosed approach is easily integrated in current systems by defining ciphers that provide forward security and that are compatible with current security systems and architectures. Processes and data structures that efficiently provide random access in a key updating sequence have been described.

Further, a fast stream cipher that can efficiently seek to arbitrary locations in its keystream has been described. Unlike RC4, which cannot seek at all, and SEAL, which can seek only to a limited number of locations in the keystream, the approach described herein can seek to any location in the keystream. The cipher can efficiently seek to arbitrary locations in its keystream despite the fact that it does not use a linear state update function. This property is apparent from the architecture of the cipher in which its computation graph may be represented by a tree. Keystream can be efficiently generated using a preorder traversal of the tree, and the tree structure lends itself to parallelization.

Implementations may be embodied in one or more hardware circuits, one or more field programmable gate arrays (FPGAs), or in one or more software programs or processes. Any such implementation may be parallelized, offering significant gains in performance, as a result of the tree structure of the computations.

In an alternative embodiment, internal nodes may be used for tree traversal in addition to the leaf nodes. Directed graphs of many forms may be used as alternatives to trees.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Appendix A: Source Code

The ANSI C source code for the functions f, g, d and h is given below, in which each function is implemented using a macro. In these definitions, a and b are 32-bit unsigned integers (or uint32_ts, in POSIX terminology), and the function F is represented by the array F[256] of 32-bit unsigned integers. The macros ROT8 and ROT24 implement rotation by eight bits and twenty-four bits, respectively, where the direction of rotation is towards the most significant bit.

```
#define ROT8(x) (((x) << 8) | ((x) >> 24))
#define ROT24(x) (((x) << 24) | ((x) >> 8))
#define f(x, y, z, F) (           \
    z += z,                       \
    y = ROT24(y),                 \
    x ^= F[x & 0xFF],             \
    y ^= F[y & 0xFF],             \
    y = ROT24(y),                 \
    x = ROT8(x),                  \
    x ^= F[x & 0xFF],             \
    y ^= F[y & 0xFF],             \
    x = ROT8(x)                   \
)
#define g(x, y, z, F) (           \
    z += (z+1),                   \
    x = ~x;                       \
    x = ROT24(x),                 \
    x ^= F[x & 0xFF],             \
    y ^= F[y & 0xFF],             \
    x = ROT24(x),                 \
    y = ROT8(y),                  \
    x ^= F[x & 0xFF],             \
    y ^= F[y & 0xFF],             \
    y = ROT8(y)                   \
)
#define d(x, y, z) (              \
    x += y                        \
    y += x,                       \
    x += y                        \
)
#define h(a, b) (a ^ b)
```

The source code to produce the jth word of output (that is, bytes 4j through 4j+3) is given below, where j is represented by the variable leaf_num.

```
uint32_t
leviathan_output(int leaf_num) {
    int i;
    uint32_t x, y, z;
    i = 1 << (LEVIATHAN_HEIGHT-1);
    x = y = 0;
    z = 1;
    while (i > 0 ) {
        d(x, y, z);
        if (i & leaf) {
            g(x, y, z, F); /* right */
        } else {
            f(x, y, z, F); /* left */
        }
        i >>= 1;
    }
    return h(x, y);
}
```

Source code for an embodiment of a key setup routine follows. Here, key is a pointer to an unsigned character string of length bytes_in_key, and F is an array of TABLE_SIZE words.

```
#define TABLE_SIZE 256
#define NUM_PASSES 2
void init_leviathan_key(const unsigned char *key,
                        size_t bytes_in_key, word *F) {
    int i, j, k, index;
    word tmp;
    for (i=0; i<TABLE_SIZE; i++)
        F[i] = 0;
/*
 * Each iteration of this loop we form the permutation of one line
 * (and, incidentally, also permute previously formed lines)
 */
    for (j=0; j<4; j++) {
        /*
         * Initialize the new line to the identity permutation, and
         * shift the existing lines over one
         */
```

-continued

```
        for (i=0; i<TABLE_SIZE; i++)
            F[i] = F[i] * TABLE_SIZE + i;
        /*
         * Initialize index to a line-dependant value, so that the
         * four lines will get distinct permutations
         */
        index = j;
        /*
         * Do the byte-swapping NUM_PASSES times, using the new
         * line as the index
         */
        for (k=0; k<NUM_PASSES; k++) {
            for (i=0; i < TABLE_SIZE; i++) {
                index += (key[i % bytes_in_key] + F[i]);
                index &= (TABLE_SIZE-1);
                tmp = F[i];
                F[i] = F[index];
                F[index] = tmp;
            }
        }
    }
    /*
     * Finally, set S0 equal to the xor of itself with the
     * identity permutation, so that (S0 [x] ^ x) is a permutation.
     */
    for (i=0; i < TABLE_SIZE; i++)
        F[i] ^= i;
}
```

Appendix B: Test Vectors

The key represented by the hexadecimal number FA57C5C0C0DE produces the following keystream (presented as a left to right, top to bottom list of 32 bit hexadecimal numbers):

0x1861600e, 0x88244832, 0x2a6d8201, 0xffd0f37d,

0xb8767ce6, 0xe7bd8954, 0xb3fc97f0, 0xe88caba1

Appendix C: Example Source Code-Forward Secret Counter Mode

```
/*
 * fscm.c
 *
 * example code for the Forward Secret Traversal Algorithm
 *
 * David A. McGrew
 *
 */
#include
typedef unsigned word;      /* holds state of a node      */
#define height 5            /* the height of the tree     */
typedef struct {
    int top ;               /* indexes top element in stack    */
    word node[height];      /* stack containing path from highest *
                             * known node to the current leaf    */
} stack;
word top(stack *s) { return s->node[s->top]; }
void push(stack *s, word x) { s->top++; s->node[s->top] = x; }
word pop(stack *s) {
    word tmp;
    tmp = s->node[s->top];
    s->node[s->top--] = 0;    /* zeroize old stack elements! */
    return tmp;
}
word pow2(word x) { return (word)1 << x; }
/* initialize a stack */
void
```

-continued

```
stack_init(stack *s) {
    word i;
    /* set intermediate nodes to the children of the path from   *
     * root to the leftmost leaf                                 */
    for (i=0; i < height-1; i++)
        s->node[i] = pow2(i+1)+1;
    /* set top node to leftmost leaf */
    s->node[i] = pow2(i);
    s->top = i;
}
void
stack_print(stack *s) {
    int i;
    printf("stack: ");
    for (i=0; i < height; i++)
        printf("%2u ", s->node[i]);
}
word left(word x) { return x << 1; }
word right(word x) { return (x << 1)+1; }
/* stack_traverse generates the next num_leaves leaves   *
 * given the context in the stack s                      */
void
stack_traverse(stack *s, int num_leaves) {
    word x;
    /* continue traversal until num_leaves have been generated */
    while (num_leaves -- > 0) {
        stack_print(s);      /* print all stack elements       */
        x = pop(s);          /* pop stack and set x            */
        while (x < pow2(height-1)) { /* go left until at a leaf, */
            push(s, right(x)); /* pushing right children of the path */
            x = left(x);
        }
        printf(" output: %d\n", x);    /* output leaf      */
    }
}
int
main ( ) {
    stack s;
    printf("forward secret traversal example driver\n");
    stack_init(&s);
    stack_traverse(&s, 10);
    stack_traverse(&s, 6);
    return 0;
}
```

What is claimed is:

1. A method of automatically generating an updated key value for a segment of keystream for use in a cipher, with forward security, the method comprising the computer-implemented steps of:

receiving a location value that identifies a location of the segment within the keystream;

generating the updated key value corresponding to the identified segment and based on a current key value by performing:

creating and storing values in a memory that correspond to a logical tree, wherein the tree represents the keystream, wherein each leaf node of the tree represents a particular keystream segment associated with a discrete location in the keystream, and wherein an order of each leaf node in pre-order traversal of the tree corresponds to a sequential order of all keystream segments;

creating and storing an ordered plurality of data elements, wherein each of the data elements is identifiable by a node value that is associated with a unique leaf node or intermediate node in the tree, and wherein each of the data elements stores a keystream segment;

advancing to the updated key by outputting that particular keystream segment stored in a next data element from among the ordered plurality of data elements, and updating the ordered plurality of data elements to discard used data elements;

seeking a future key without discarding the updated key by locating a highest internal node in the tree that is an ancestor node of that node corresponding to the updated key and applying one or more pseudo-random functions to each node in the tree that is traversed from the highest internal node to a node representing the future key.

2. A method as recited in claim 1, wherein seeking comprises generating the key value based on the steps of:
   selecting a highest-ordered element from among the plurality of data elements;
   if the selected element is not associated with a leaf node, then:
      storing, in a new highest-ordered element among the plurality of data elements, a first new key value that is determined by applying a first pseudo-random function to the selected element;
      generating a second new key value by applying a second pseudo-random function to the selected element.

3. A method as recited in claim 1, wherein advancing further comprises generating the updated key value based on the steps of:
   returning, as the updated key value, a segment of the keystream associated with the node identified in the selected next node value when such node is a leaf node;
   returning, as the key value that is generated, a segment of the keystream associated with the second new node value when the node identified in the selected next node value is not a leaf node.

4. A method as recited in claim 1, wherein each edge of the tree is associated with a distinct pseudo-random function that, when applied to a current key, results in generating a new updated key.

5. A method as recited in claim 1, further comprising the steps of distributing the updated key value to each member of a multicast group for use in secure communications among the multicast group.

6. A method as recited in claim 1, wherein generating the updated key value further comprises generating the key value based on the steps of:
   determining a current location value;
   identifying an internal node of the tree having a highest node number that is an ancestor of a first node corresponding to the received location value and of a second node corresponding to the current location value;
   determining a path from the identified internal node to the first node;
   traversing the path while applying a first pseudo-random key updating function to the then-current key value during each leftward downward transition and applying a second pseudo-random function during each rightward downward transition.

7. A method as recited in claim 6, wherein generating the updated key value further comprises generating the updated key value based on the steps of:
   storing, in a new highest-ordered element among the plurality of data elements, each new key value that is generated as part of applying the first and second pseudo-random functions;
   generating, as the updated key value, the new key value that stored in the highest-ordered element among the plurality of data elements, when the first node is reached in traversing the path.

8. A method as recited in claim 1, wherein each edge leading leftward and downward from a first node to a second node is associated with a first pseudo-random key updating function, and wherein each edge leading rightward and downward from the first node to a third node is associated with a second pseudo-random key updating function.

9. A method as recited in claim 8, wherein each of the pseudo-random functions receives, as input, a first keystream segment and generates, as output, a second keystream segment based on updating the first keystream segment in a pseudo-random manner, such that determining the first keystream segment based on the second keystream segment is computationally infeasible.

10. A method of automatically generating an updated key value for a segment of keystream for use in a cipher, with forward security, the method comprising the computer-implemented steps of:
   receiving a location value that identifies a location of the segment within the keystream;
   generating the updated key value corresponding to the identified segment and based on a current key value with forward security , wherein determining another key value based on the current key, the updated key, and state values that are stored during the generating is computationally infeasible, by performing:
   creating and storing values in a memory that correspond to a logical tree, wherein the tree represents the keystream, wherein each leaf node of the tree represents a particular keystream segment associated with a discrete location in the keystream, and wherein an order of each leaf node in pre-order traversal of the tree corresponds to a sequential order of all keystream segments;
   creating and storing an ordered plurality of data elements, wherein each of the data elements is identifiable by a node value that is associated with a unique leaf node or intermediate node in the tree, and wherein each of the data elements stores a keystream segment;
   selecting a highest-ordered element from among the plurality of data elements;
   if the selected element is not associated with a leaf node, then:
      storing, in a new highest-ordered element among the plurality of data elements, a first new key value that is determined by applying a first pseudo-random function to the selected element;
      generating a second new key value by applying a second pseudo-random function to the selected element;
   returning, as the updated key value, a segment of the keystream associated with the node identified in the selected next node value when such node is a leaf node;
   returning, as the key value that is generated, a segment of the keystream associated with the second new node value when the node identified in the selected next node value is not a leaf node;
   determining a current location value;
   identifying an internal node of the tree having a highest node number that is an ancestor of a first node corresponding to the received location value and of a second node corresponding to the current location value;
   determining a path from the identified internal node to the first node;
      traversing the path while applying a first pseudo-random key updating function to the then-current key value during each leftward downward transition and applying a second pseudo-random function during each rightward downward transition;

storing, in a new highest-ordered element among the plurality of data elements, each new key value that is generated as part of applying the first and second pseudo-random functions;

generating, as the updated key value, the new key value that stored in the highest-ordered element among the plurality of data elements, when the first node is reached in traversing the path.

11. An apparatus for automatically generating an updated key value for a segment of keystream for use in a cipher, with forward security, comprising:

means for receiving a location value that identifies a location of the segment within the keystream;

means for generating the updated key value comprising:

means for creating and storing values in a memory that correspond to a logical tree, wherein the tree represents the keystream, wherein each leaf node of the tree represents a particular keystream segment associated with a discrete location in the keystream, and wherein an order of each leaf node in pre-order traversal of the tree corresponds to a sequential order of all keystream segments;

means for creating and storing an ordered plurality of data elements, wherein each of the data elements is identifiable by a node value that is associated with a unique leaf node or intermediate node in the tree, and wherein each of the data elements stores a keystream segment;

means for advancing to the updated key by outputting that particular keystream segment stored in a next data element from among the ordered plurality of data elements, and updating the ordered plurality of data elements to discard used data elements;

means for seeking a future key without discarding the updated key by locating a highest internal node in the tree that is an ancestor node of that node corresponding to the updated key and applying one or more pseudo-random functions to each node in the tree that is traversed from the highest internal node to a node representing the future key.

12. An apparatus as recited in claim 11, wherein the means for seeking further comprises means for selecting a highest-ordered element from among the plurality of data elements; means, if the selected element is not associated with a leaf node, for storing, in a new highest-ordered element among the plurality of data elements, a first new key value that is determined by applying a first pseudo-random function to the selected element, and for generating a second new key value by applying a second pseudo-random function to the selected element.

13. An apparatus as recited in claim 11, wherein the means for generating the updated key value further comprises means for returning, as the updated key value, a segment of the keystream associated with the node identified in the selected next node value when such node is a leaf node; means for returning, as the key value that is generated, a segment of the keystream associated with the second new node value when the node identified in the selected next node value is not a leaf node.

14. An apparatus as recited in claim 11, wherein each edge of the tree is associated with a distinct pseudo-random function that, when applied to a current key, results in generating a new updated key.

15. An apparatus as recited in claim 11, wherein the means for generating the updated key value further comprises:

means for determining a current location value;

means for identifying an internal node of the tree having a highest node number that is an ancestor of a first node corresponding to the received location value and of a second node corresponding to the current location value;

means for determining a path from the identified internal node to the first node;

means for traversing the path while applying a first pseudo-random key updating function to the then-current key value during each leftward downward transition and applying a second pseudo-random function during each rightward downward transition.

16. An apparatus as recited in claim 15, wherein the means for generating the updated key value further comprises means for storing, in a new highest-ordered element among the plurality of data elements, each new key value that is generated as part of applying the first and second pseudo-random functions; means for generating, as the updated key value, the new key value that stored in the highest-ordered element among the plurality of data elements, when the first node is reached in traversing the path.

17. An apparatus for automatically generating an updated key value for a segment of keystream for use in a cipher, with forward security, comprising:

a network interface that is coupled to the data network for receiving one or more packet flows therefrom;

a processor;

one or more stored sequences of instructions which, when executed by the processor, cause the processor to carry out the steps of:

receiving a location value that identifies a location of the segment within the keystream;

generating the updated key value corresponding to the identified segment and based on a current key value ,by performing:

creating and storing values in a memory that correspond to a logical tree, wherein the tree represents the keystream, wherein each leaf node of the tree represents a particular keystream segment associated with a discrete location in the keystream, and wherein an order of each leaf node in pre-order traversal of the tree corresponds to a sequential order of all keystream segments;

creating and storing an ordered plurality of data elements, wherein each of the data elements is identifiable by a node value that is associated with a unique leaf node or intermediate node in the tree, and wherein each of the data elements stores a keystream segment;

advancing to the updated key by outputting that particular keystream segment stored in a next data element from among the ordered plurality of data elements, and updating the ordered plurality of data elements to discard used data elements;

seeking a future key without discarding the updated key by locating a highest internal node in the tree that is an ancestor node of that node corresponding to the updated key and applying one or more pseudo-random functions to each node in the tree that is traversed from the highest internal node to a node representing the future key.

18. An apparatus as recited in claim 17, wherein the instructions for seeking further comprise instructions for performing:

selecting a highest-ordered element from among the plurality of data elements;

if the selected element is not associated with a leaf node, then:

storing, in a new highest-ordered element among the plurality of data elements, a first new key value that is determined by applying a first pseudo-random function to the selected element;

generating a second new key value by applying a second pseudo-random function to the selected element.

19. An apparatus as recited in claim 17, wherein the instructions for advancing further comprise instructions for performing:
returning, as the updated key value, a segment of the keystream associated with the node identified in the selected next node value when such node is a leaf node;
returning, as the key value that is generated, a segment of the keystream associated with the second new node value when the node identified in the selected next node value is not a leaf node.

20. An apparatus as recited in claim 17, wherein the instructions for generating the updated key value further comprise instructions for performing:
determining a current location value;
identifying an internal node of the tree having a highest node number that is an ancestor of a first node corresponding to the received location value and of a second node corresponding to the current location value;
determining a path from the identified internal node to the first node;
traversing the path while applying a first pseudo-random key updating function to the then-current key value during each leftward downward transition and applying a second pseudo-random function during each rightward downward transition.

21. An apparatus as recited in claim 17, wherein the instructions for generating the updated key value further comprise instructions for performing:
storing, in a new highest-ordered element among the plurality of data elements, each new key value that is generated as part of applying the first and second pseudo-random functions;
generating, as the updated key value, the new key value that stored in the highest-ordered element among the plurality of data elements, when the first node is reached in traversing the path.

22. An apparatus as recited in claim 17, wherein each edge of the tree is associated with a distinct pseudo-random function that, when applied to a current key, results in generating a new updated key.

23. An apparatus as recited in claim 17, further comprising instructions for performing distributing the updated key value to each member of a multicast group for use in secure communications among the multicast group.

24. An apparatus as recited in claim 17, wherein each edge leading leftward and downward from a first node to a second node is associated with a first pseudo-random key updating function, and wherein each edge leading rightward and downward from the first node to a third node is associated with a second pseudo-random key updating function.

25. An apparatus as recited in claim 24, wherein each of the pseudo-random functions receives, as input, a first keystream segment and generates, as output, a second keystream segment based on updating the first keystream segment in a pseudo-random manner, such that determining the first keystream segment based on the second keystream segment is computationally infeasible.

* * * * *